(12) United States Patent
Groteleuschen et al.

(10) Patent No.: US 10,611,416 B1
(45) Date of Patent: Apr. 7, 2020

(54) CABIN ASSEMBLY

(71) Applicant: Oshkosh Defense, LLC, Oshkosh, WI (US)

(72) Inventors: Mike Groteleuschen, Oshkosh, WI (US); Kris Krueger, Oshkosh, WI (US); Mark Boyce, Oshkosh, WI (US); Harold Vincent, Oshkosh, WI (US); Jake Leeman, Oshkosh, WI (US); Scott Mueller, Oshkosh, WI (US); Micah Richmond, Omro, WI (US); Tim Snyder, Oshkosh, WI (US); Jennifer King, Oshkosh, WI (US); Terry Carlson, Oshkosh, WI (US); Mike Wrege, Oshkosh, WI (US)

(73) Assignee: Oshkosh Defense, LLC, Oshkosh, WI (US)

( * ) Notice: Subject to any disclaimer, the term of this patent is extended or adjusted under 35 U.S.C. 154(b) by 105 days.

(21) Appl. No.: 15/957,307

(22) Filed: Apr. 19, 2018

Related U.S. Application Data

(66) Substitute for application No. 62/491,022, filed on Apr. 27, 2017.

(60) Provisional application No. 62/491,427, filed on Apr. 28, 2017, provisional application No. 62/491,975, filed on Apr. 28, 2017.

(51) Int. Cl.
*B62D 33/06* (2006.01)
*B62D 33/067* (2006.01)
*B62D 33/07* (2006.01)
*F41H 5/22* (2006.01)
*F41H 7/04* (2006.01)

(52) U.S. Cl.
CPC ....... *B62D 33/071* (2013.01); *B62D 33/0604* (2013.01); *B62D 33/067* (2013.01); *F41H 5/226* (2013.01); *F41H 7/044* (2013.01); *F41H 7/048* (2013.01)

(58) Field of Classification Search
CPC B62D 33/0604; B62D 33/063; B62D 33/067; B62D 33/07; B62D 33/071
See application file for complete search history.

(56) References Cited

U.S. PATENT DOCUMENTS

| | | |
|---|---|---|
| 4,621,150 A | 11/1986 | Hirai et al. |
| 5,417,299 A | 5/1995 | Pillar et al. |
| 5,697,741 A | 12/1997 | Harris et al. |
| 5,779,300 A | 7/1998 | McNeilus et al. |

(Continued)

*Primary Examiner* — Gregory A Blankenship
(74) *Attorney, Agent, or Firm* — Foley & Lardner LLP

(57) ABSTRACT

A vehicle includes a frame, tractive assemblies engaging the frame, a cabin configured to contain at least one operator during operation of the vehicle, and a mount configured to pivotably couple the cabin to the frame. The mount includes a boss coupled to the cabin and defining a first aperture, a first bracket defining a second aperture, a pin extending through the first and second apertures, a second bracket coupled to the frame, and a pair of isolators extending between the first bracket and the second bracket. The isolators are configured to couple the first bracket to the second bracket and to reduce the transfer of vibrations between the frame and the cabin. The cabin is configured to rotate between use position and maintenance positions. The cabin is positioned near the frame in the use position and rotated away from the frame in the maintenance position.

8 Claims, 36 Drawing Sheets

(56) References Cited

U.S. PATENT DOCUMENTS

| | | | |
|---|---|---|---|
| 5,829,946 A | 11/1998 | McNeilus et al. | |
| 5,931,628 A | 8/1999 | Christenson | |
| 6,290,450 B1 | 9/2001 | Humphries et al. | |
| 6,485,079 B1 | 11/2002 | Brown et al. | |
| 6,527,495 B2 | 3/2003 | Humphries et al. | |
| 6,666,491 B2 | 12/2003 | Schrafel | |
| 6,692,052 B1 * | 2/2004 | Sutton | B62D 21/15 267/276 |
| 6,918,721 B2 | 7/2005 | Venton-Walters et al. | |
| 6,997,506 B2 | 2/2006 | Hecker | |
| 7,055,880 B2 | 6/2006 | Archer | |
| 7,073,847 B2 | 7/2006 | Morrow et al. | |
| 7,118,314 B2 | 10/2006 | Zhou et al. | |
| 7,264,305 B2 | 9/2007 | Kuriakose | |
| 7,370,904 B2 | 5/2008 | Wood et al. | |
| 7,517,005 B2 | 4/2009 | Kuriakose | |
| 7,823,948 B2 | 11/2010 | Redman et al. | |
| 7,954,882 B2 | 6/2011 | Brummel et al. | |
| 8,152,216 B2 | 4/2012 | Howell | |
| 8,376,439 B2 | 2/2013 | Kuriakose et al. | |
| 8,794,886 B1 | 8/2014 | Nett et al. | |
| 8,943,946 B1 | 2/2015 | Richmond et al. | |
| 8,955,859 B1 | 2/2015 | Richmond et al. | |
| 8,967,699 B1 | 3/2015 | Richmond et al. | |
| 9,174,686 B1 | 11/2015 | Messina et al. | |
| 9,329,000 B1 | 5/2016 | Richmond et al. | |
| 9,493,093 B2 | 11/2016 | Stingle et al. | |
| 9,633,507 B2 | 4/2017 | Wolf et al. | |
| 9,707,869 B1 | 7/2017 | Messina et al. | |
| 9,738,186 B2 | 8/2017 | Krueger et al. | |
| 9,829,282 B1 | 11/2017 | Richmond et al. | |
| 2009/0085377 A1 * | 4/2009 | Hayes | B62D 33/0604 296/190.07 |
| 2011/0017536 A1 * | 1/2011 | Chunduru | B62D 33/067 180/89.14 |
| 2012/0200116 A1 * | 8/2012 | Klein | B62D 33/0604 296/190.07 |
| 2014/0361566 A1 * | 12/2014 | Oh | B62D 33/0604 296/35.1 |
| 2019/0300076 A1 * | 10/2019 | Tilp | B62D 33/067 |

* cited by examiner

CABIN ASSEMBLY

CROSS-REFERENCE TO RELATED PATENT APPLICATIONS

This application claims the benefit of U.S. Provisional Application No. 62/491,975, filed Apr. 28, 2017, U.S. Provisional Application No. 62/491,427, filed Apr. 28, 2017, and U.S. Provisional Application No. 62/491,022, filed Apr. 27, 2017, all of which are incorporated herein by reference in their entireties.

BACKGROUND

Vehicles have limited ability to house components in a compact manner while remaining resistant to a blast event. Conventionally, engines are located near the front of a vehicle to facilitate access to the engine for maintenance. Some vehicles locate their engines below a front cabin of the vehicle, rotating the front cabin away from the engine to facilitate maintenance. These arrangements conventionally require a relatively large number of components to facilitate the rotation of the front cabin, and these components may not provide optimal blast resistance. Additionally, these arrangements conventionally transmit a significant amount of the vibration of the vehicle into the front cabin.

Vehicles additionally have a limited ability to comfortably house occupants inside a cabin. Some military vehicles include a mounted gun coupled to the roof of a front cabin. To operate the mounted gun, an occupant stands near the center of the front cabin and extends their head and a portion of their upper body through an aperture in the roof of the front cabin. When not operating the gun, however, the occupant sits in a seat located within the front cabin. In some vehicles, the floor of the center portion of the vehicle is raised relative to the rest of the front cabin (e.g., to raise the occupant to facilitate operation of the mounted gun, to provide a tunnel for an engine of the vehicle, etc.). This reduces the distance between the seat mounted on this raised floor and the roof of the front cabin. Accordingly, the roof may interfere with the headroom of the occupant when seated in the seat.

Vehicles additionally have a limited ability to change between armored and unarmored configurations. Military vehicles often have armored doors to increase the resistance of the vehicle to an exterior blast event. Some such vehicles are capable of switching between armored and unarmored configurations depending on the intended use of the vehicle. Changing between armored and unarmored configurations conventionally requires replacement of the entire door. Manufacturing and storing entire sets of replacement doors represents a large cost and requires a large amount of storage space.

SUMMARY

One exemplary embodiment relates to a vehicle including a frame including a frame rail that extends longitudinally, multiple tractive assemblies engaging the frame, a cabin configured to contain at least one operator during operation of the vehicle, and a mount configured to pivotably couple the cabin to the frame. The mount includes a boss coupled to the cabin and defining a first aperture, a first bracket defining a second aperture, a pin extending through the first aperture and the second aperture to pivotably couple the boss to the first bracket, a second bracket coupled to the frame rail, and a first isolator and a second isolator extending between the first bracket and the second bracket. The first isolator and the second isolator are configured to couple the first bracket to the second bracket and to reduce the transfer of vibrations between the frame and the cabin. The cabin is configured to rotate between a use position and a maintenance position. The cabin is positioned near the frame in the use position and rotated away from the frame in the maintenance position.

Another exemplary embodiment relates to a vehicle including a chassis, multiple tractive assemblies engaging the chassis, and a cabin coupled to the chassis and configured to contain an operator during operation of the vehicle. The cabin includes a floor section, a roof positioned above the floor section, the roof defining an aperture sized to receive at least the torso of the operator therethrough, and a seat slidably coupled to the floor section and configured to support the operator. The seat is selectively repositionable between a use position and a stored position. In the stored position, the seat is located below the roof but not directly below the aperture. In the use position, the seat is located below the roof and directly below the aperture.

Yet another exemplary embodiment relates to a vehicle including a front cabin configured to contain an operator within an interior of the front cabin and a door coupled to the front cabin and selectively reconfigurable between a locked configuration and an unlocked configuration. The door includes a frame rotatably coupled to a wall of the front cabin and a lock assembly coupled to the frame. The lock assembly limits movement of the frame relative to the wall when the door is in the locked configuration. The vehicle is selectively reconfigurable between an A-kit configuration and a C-kit configuration. The door provides a greater degree of protection to the operator in the C-kit configuration than in the A-kit configuration. In the C-kit configuration, the door includes an additional component not present in the A-kit configuration. The door includes the frame in both the A-kit configuration and the C-kit configuration.

The invention is capable of other embodiments and of being carried out in various ways. Alternative exemplary embodiments relate to other features and combinations of features as may be recited herein.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

According to an exemplary embodiment, a vehicle includes various components that improve performance relative to traditional systems. The vehicle includes a front cabin rotatably coupled to a frame by a pair of pivot mounts. A pair of hydraulic cylinders are arranged beneath the front cabin and configured to rotate the front cabin between a use position and a maintenance position. A pair of rear supports support a rear end of the front cabin in the maintenance position and each include a latch that selectively holds the front cabin in the use position. The pivot mounts and the rear supports include isolators that reduce the vibration transmitted to the front cabin from the frame.

A turret assembly is mounted to a roof of the front cabin. An occupant of the front cabin can extend their upper body through an aperture in the roof to access the turret assembly and fire a weapon. While accessing the turret assembly, the operator can stand on a center floor section that is raised relative to the rest of the floor in the front cabin. When accessing the turret assembly, the operator can sit in a seat coupled to the center floor section. The seat is movable from a stored position to a use position. In the stored position, the seat is located proximate a rear wall of the front cabin where it does not obstruct movement of the occupants in the front of the front cabin. Because the center floor section is raised, if the operator were to sit in the seat in the stored position, their head would likely contact the roof. In the use position, the seat is located directly below the aperture in the roof, providing ample head clearance for the occupant. The inclusion of a movable seat facilitates the seat being stored in an unobtrusive position when not needed, while still providing a comfortable riding experience for the occupant.

The front cabin further includes a door having a frame. The vehicle is reconfigurable between a first configuration and a second configuration, where the vehicle has increased protection for the operator in the second configuration. When changing between the first configuration and the second configuration, a number of components are added to or removed from the door to modify the degree of protection afforded by the door. The frame is configured such that the same frame can be used in the various configurations and interface with the various components.

Figure 1:
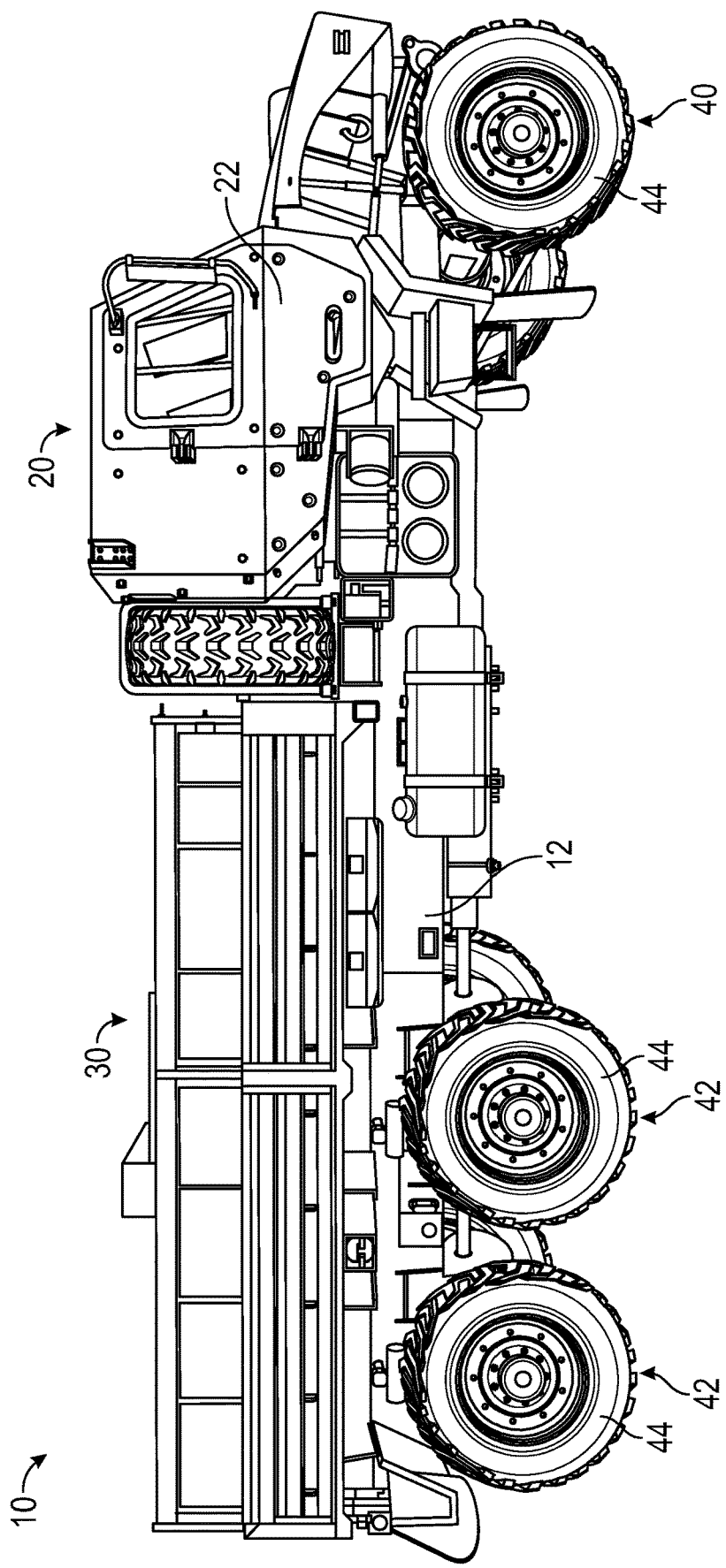
FIG. 1 is a side view of a vehicle, according to an exemplary embodiment.

According to the exemplary embodiment shown in FIG. 1, a vehicle, shown as vehicle 10, includes a chassis, shown as frame 12, that supports a body assembly including a first portion, shown as front cabin 20, and a second portion, shown as mission equipment 30. As shown in FIG. 1, the mission equipment 30 is disposed behind the front cabin 20. The frame 12 of the vehicle 10 engages a plurality of tractive assemblies, shown as front tractive assemblies 40 and rear tractive assemblies 42. According to an exemplary embodiment, the vehicle 10 is a military ground vehicle. In other embodiments, the vehicle 10 is an off-road vehicle such as a utility task vehicle, a recreational off-highway vehicle, an all-terrain vehicle, a sport utility vehicle, and/or still another vehicle. In yet other embodiments, the vehicle 10 is another type of off-road vehicle such as mining, construction, and/or farming equipment. In still other embodiments, the vehicle 10 is an aerial truck, a rescue truck, an aircraft rescue and firefighting (ARFF) truck, a concrete mixer truck, a refuse truck, a commercial truck, a tanker, an ambulance, and/or still another vehicle.

According to an exemplary embodiment, the frame 12 defines a longitudinal axis. The longitudinal axis may be generally aligned with a frame rail of the frame 12 of the vehicle 10 (e.g., front-to-back, etc.). In some embodiments, the vehicle 10 includes a plurality of front tractive assemblies 40 and/or a plurality of rear tractive assemblies 42 (e.g., one, two, etc.). The front tractive assemblies 40 and/or the rear tractive assemblies 42 may include brakes (e.g., disc brakes, drum brakes, air brakes, etc.), gear reductions, steering components, wheel hubs, wheels, tires, and/or other features. As shown in FIG. 1, the front tractive assemblies 40 and the rear tractive assemblies 42 each include tractive elements, shown as wheel and tire assemblies 44. In other embodiments, at least one of the front tractive assemblies 40 and the rear tractive assemblies 42 include a different type of tractive element (e.g., a track, etc.).

According to an exemplary embodiment, the front cabin 20 includes one or more doors, shown as doors 22, that facilitate entering and exiting an interior of the front cabin 20. The interior of the front cabin 20 may include a plurality of seats (e.g., two, three, four, five, etc.), vehicle controls, driving components (e.g., steering wheel, accelerator pedal, brake pedal, etc.), etc. According to the exemplary embodiment shown in FIG. 1, the mission equipment 30 includes a cargo body configured to facilitate transporting various military equipment (e.g., medical supplies, ammunition, weapons, missiles, personnel, etc.). In other embodiments, the mission equipment 30 includes a truck bed or a flat bed. In some embodiments, the mission equipment 30 additionally or alternatively includes a boom lift. In another embodiment, the mission equipment 30 includes an at least partially enclosed troop transport cabin configured to facilitate transporting troops (e.g., eight, ten, twelve, twenty, etc.) with the vehicle 10.

According to an exemplary embodiment, the vehicle 10 includes a powertrain system. The powertrain system may include a primary driver (e.g., an engine, a motor, etc.), an energy generation device (e.g., a generator, etc.), and/or an energy storage device (e.g., a battery, capacitors, ultra-capacitors, etc.) electrically coupled to the energy generation device. The primary driver may receive fuel (e.g., gasoline, diesel, etc.) from a fuel tank and combust the fuel to generate mechanical energy. A transmission may receive the mechanical energy and provide an output to the generator. The generator may be configured to convert mechanical energy into electrical energy that may be stored by the energy storage device. The energy storage device may provide electrical energy to a motive driver to drive at least one of the front tractive assemblies 40 and the rear tractive assemblies 42. In some embodiments, each of the front tractive assemblies 40 and/or the rear tractive assemblies 42 include an individual motive driver (e.g., a motor that is electrically coupled to the energy storage device, etc.) configured to facilitate independently driving each of the wheel and tire assemblies 44. In some embodiments, a transmission of the vehicle 10 is rotationally coupled to the primary driver, a transfer case assembly, and one or more drive shafts. The one or more drive shafts may be received by one or more differentials configured to convey the rotational energy of the drive shaft to a final drive (e.g., half-shafts coupled to the wheel and tire assemblies 44, etc.). The final drive may then propel or moves the vehicle 10. In such embodiments, the vehicle 10 may not include the generator and/or the energy storage device. The powertrain of the vehicle 10 may thereby be a hybrid powertrain or a non-hybrid powertrain. According to an exemplary embodiment, the primary driver is a compression-ignition internal combustion engine that utilizes diesel fuel. In alternative embodiments, the primary driver is another type of device (e.g., spark-ignition engine, fuel cell, electric motor, etc.) that is otherwise powered (e.g., with gasoline, compressed natural gas, hydrogen, electricity, etc.).

Front Cabin

Figure 2:
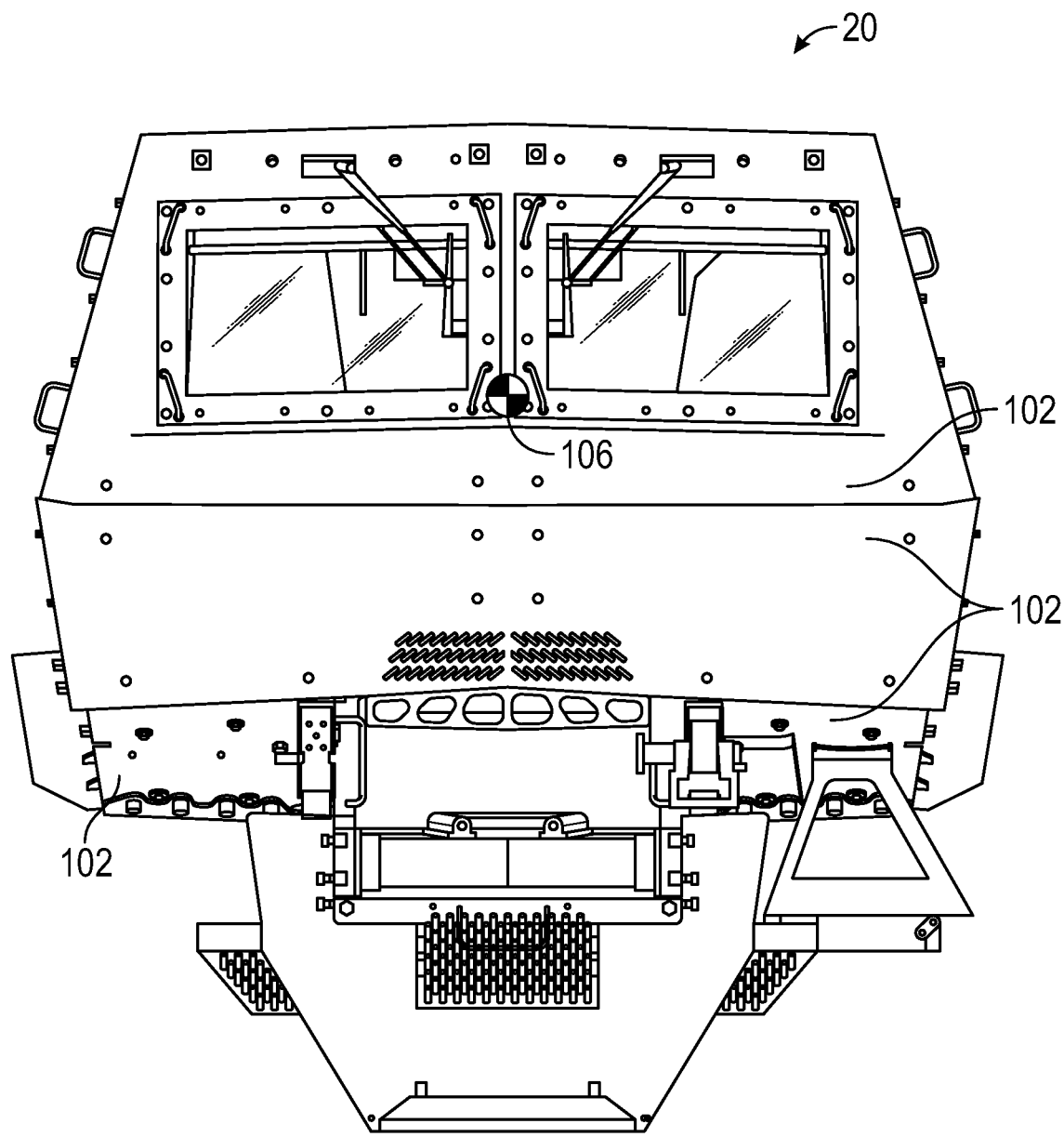
FIG. 2 is a front view of a front cabin of the vehicle of FIG. 1, according to an exemplary embodiment.
Figure 3:
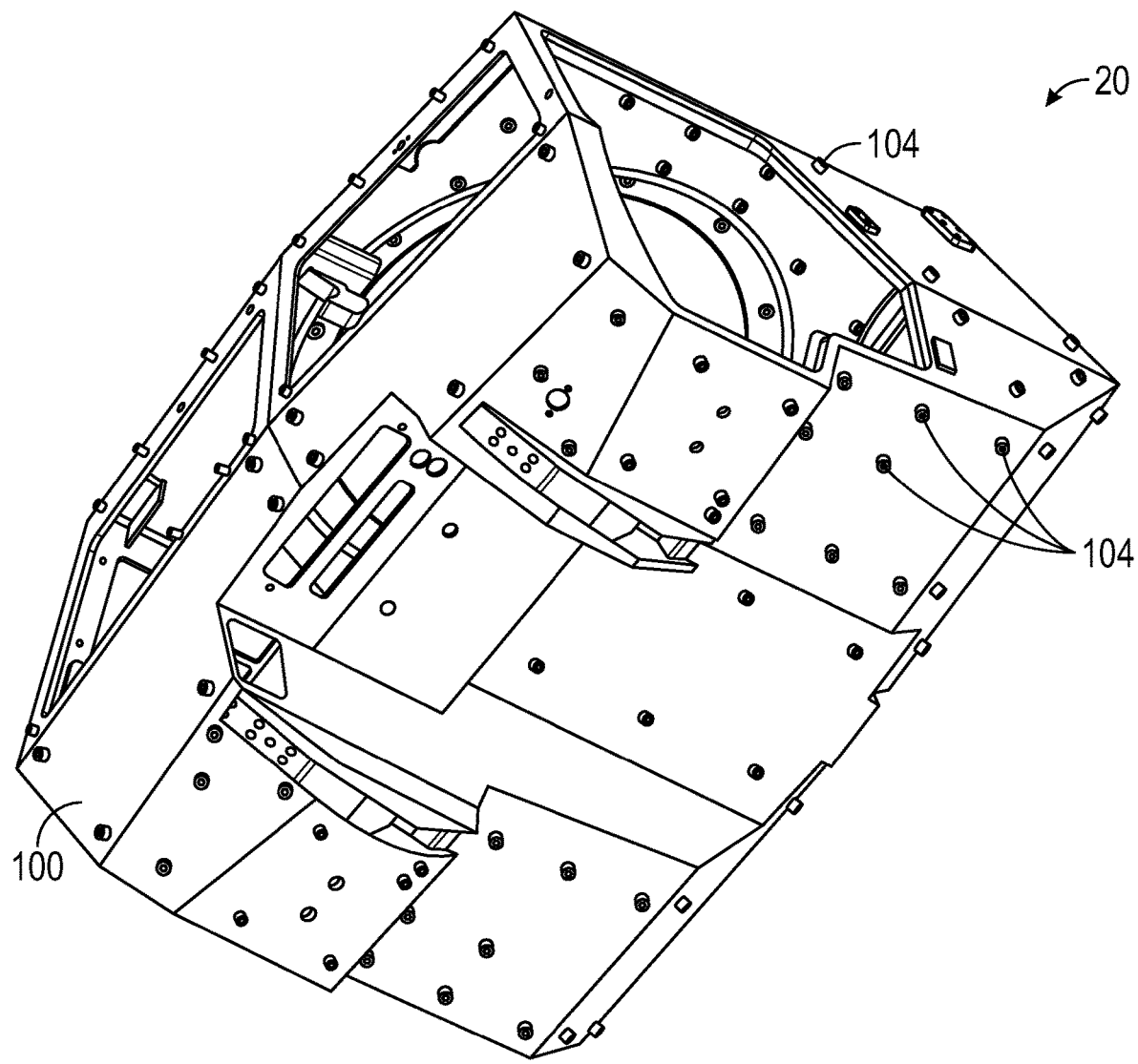
FIG. 3 is a bottom perspective view of the front cabin of FIG. 2.
Figure 4:
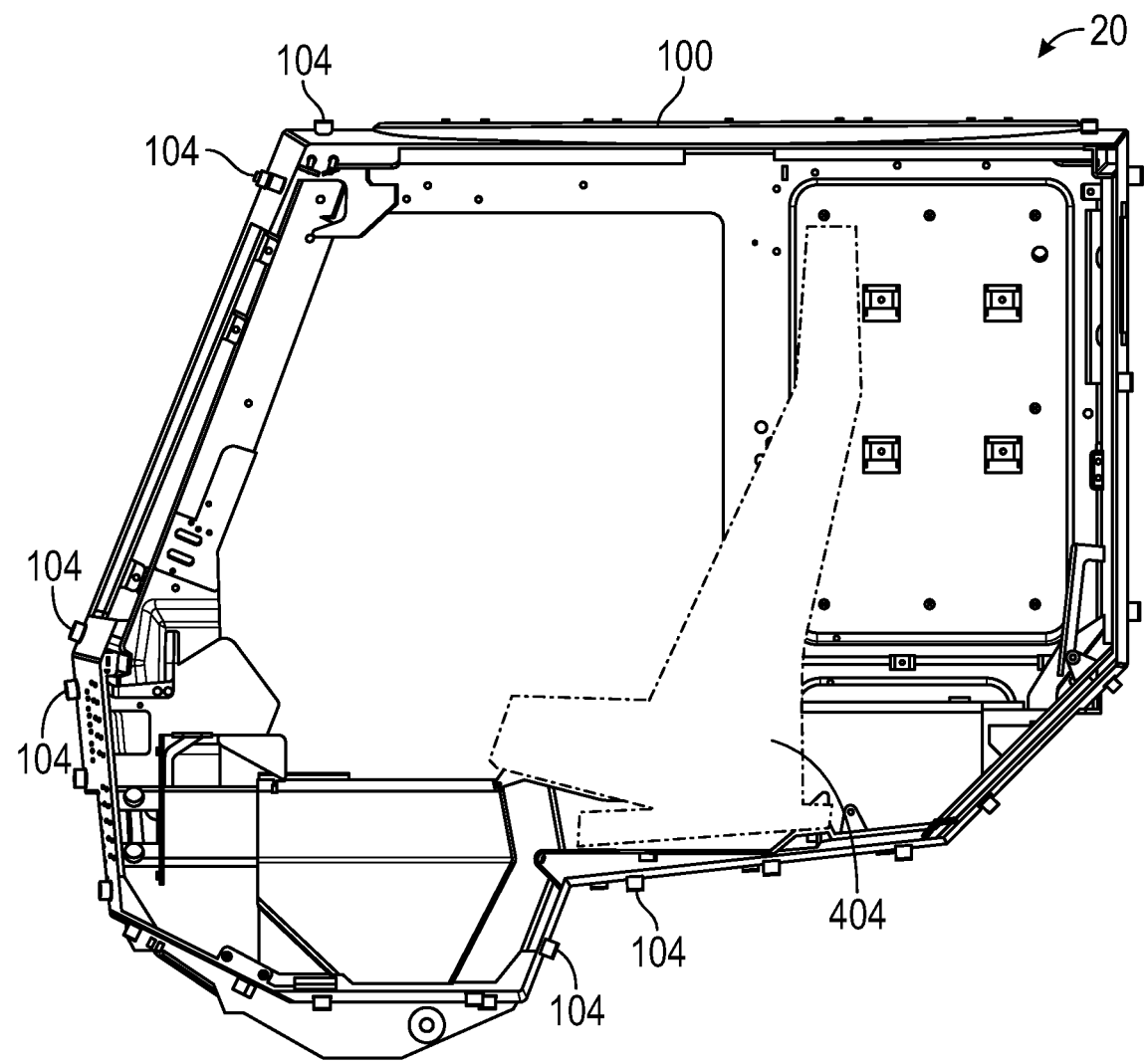
FIG. 4 is a side section view of the front cabin of FIG. 2.

Referring to FIGS. 2-4, the front cabin 20 is shown. The front cabin 20 is configured to contain one or more occupants (e.g., drivers, passengers, gunners, etc.). The front cabin 20 may be reconfigured between an armored configuration and an unarmored configuration. With the front cabin 20 in the unarmored configuration, the vehicle 10 is configured to operate in an environment with minimal risk of a blast event (e.g., explosion) occurring. In the armored configuration, the front cabin 20 is more heavily armored to afford a greater degree of protection to the occupants during a blast event. The front cabin 20 includes a support structure, shown as frame 100. In changing between the unarmored and armored configurations, one or more armor panels 102 may be coupled to the frame 100. In some embodiments, the armor panels 102 are coupled to the frame 100 through protrusions, shown as appurtenances 104, extending outward from the frame 100. The appurtenances 104 may be located on some or all outer surfaces of the frame 100, including the underside. The appurtenances 104 may be threaded to accept bolts that pass through the armor panels 102, coupling the armor panels 102 to the frame 100. The appurtenances 104 may be fixedly coupled (e.g., welded) to the frame 100 to facilitate assembly. Coupling the appurtenances 104 to the frame 100 when initially assembling the vehicle 10 may facilitate more consistent installation of the armor panels 102 than a conventional vehicle where the armor panels are welded to the vehicle after the initial assembly. Given that the armor panels 102 are not present in the unarmored configuration, the front cabin 20 may be substantially lighter in the unarmored configuration than in the armored configuration. The frame 100 may be reinforced to support the weight of the armor panels 102. Referring to FIG. 2, a center of gravity 106 of the front cabin 20 is shown. The center of gravity 106 may be approximately laterally centered along the front cabin 20.

Figure 5:
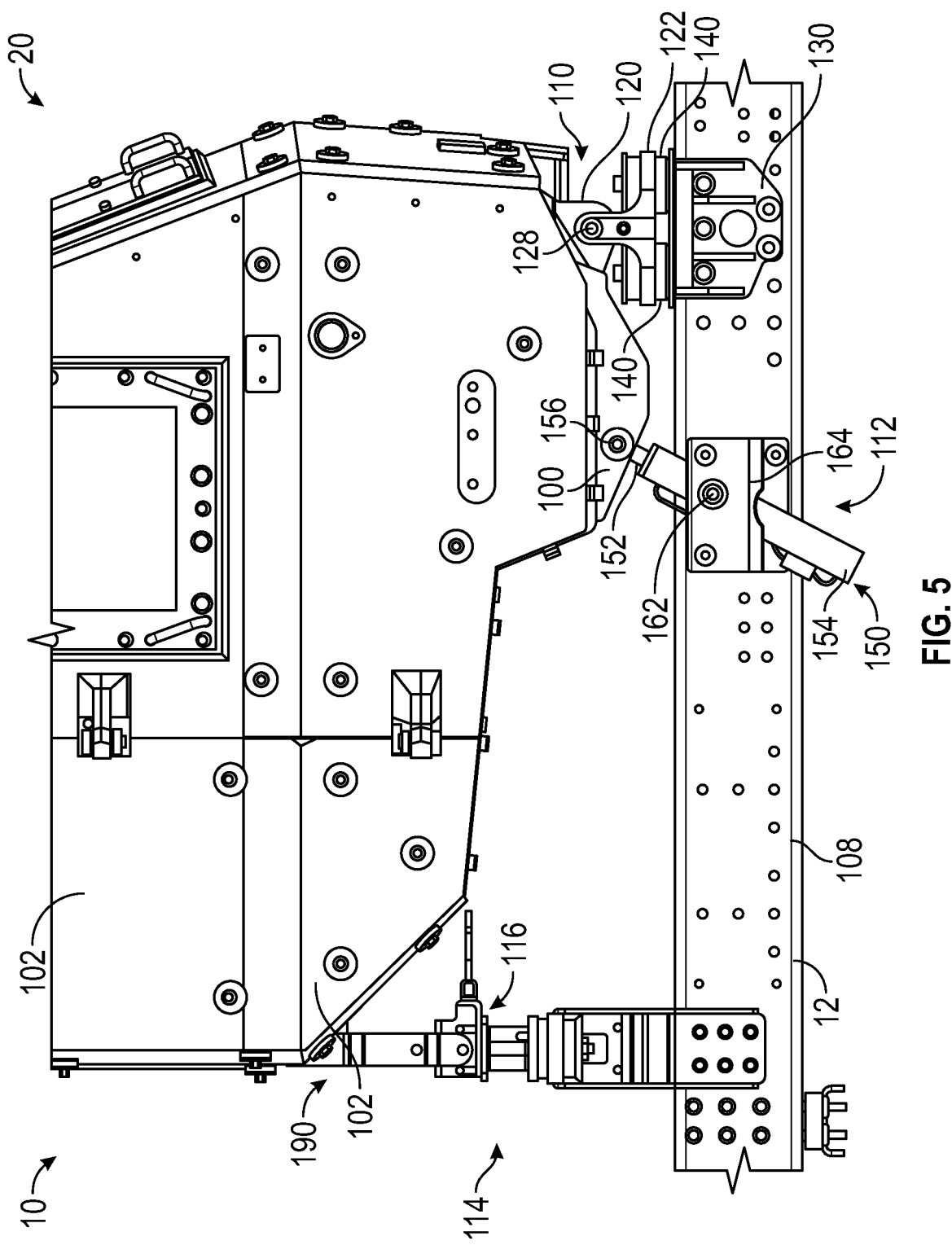
FIG. 5 is a side view of the front cabin of FIG. 2 and a frame of the vehicle of FIG. 1, according to an exemplary embodiment.
Figure 6:
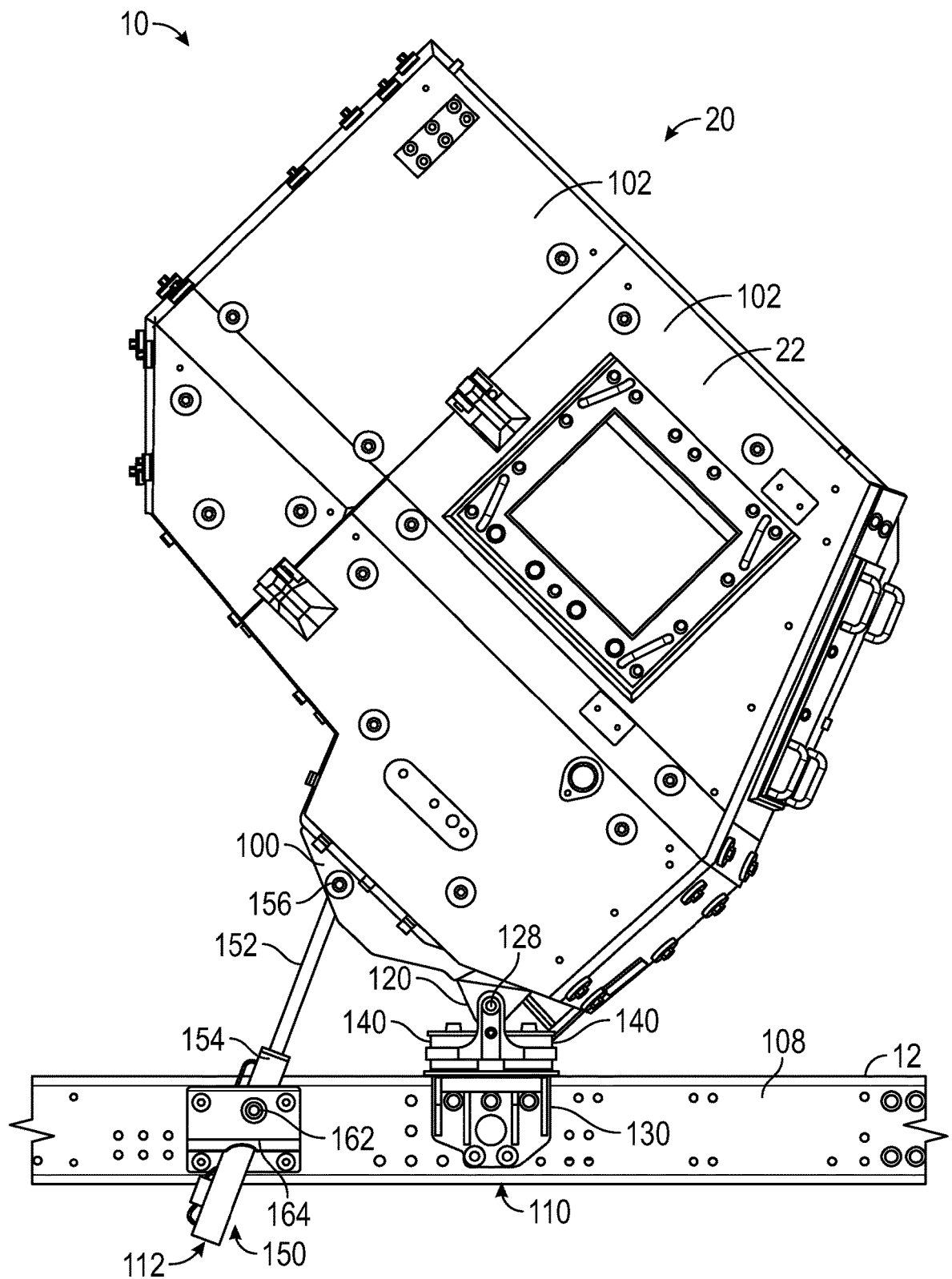
FIG. 6 is another side view of the front cabin of FIG. 2 and the frame of FIG. 5.

Referring to FIGS. 5 and 6, the front cabin 20 is rotatably coupled to the frame 12. Specifically, the front cabin 20 is rotatably coupled to a pair of frame rails 108 that extend longitudinally. A front end portion of the frame 100 is rotatably coupled to the frame 12 through a pivot mount 110. The front cabin 20 is rotatable between a use position, shown in FIG. 5, and a maintenance position, shown in FIG. 6. In the use position, the front cabin 20 is oriented generally horizontally and configured to facilitate entrance into and egress from the vehicle 10. In the maintenance position, the front cabin 20 is rotated upwards, exposing components below the front cabin 20 (e.g., the primary driver) to facilitate maintenance. An actuator assembly, shown as lift assembly 112, is configured to move the front cabin 20 between the maintenance and use positions. As the lift assembly 112 extends, the front cabin 20 is moved upwards, toward the maintenance position. The rear end portion of the front cabin 20 is supported by a support structure, shown as rear support 114. The rear support 114 supports a portion of the weight of the front cabin 20 in the use position. In some embodiments, the rear support 114 includes a latch 116 that selectively prevents rotation of the front cabin 20 out of the use position. The vehicle 10 may include pairs of frame rails 108, pivot mounts 110, lift assemblies 112, and rear supports 114 symmetrically located about a longitudinal centerline of the vehicle 10 such that both the left and right sides of the front cabin 20 are supported.

Referring to FIGS. 5-8, the pivot mount 110 is shown according to an exemplary embodiment. The pivot mount 110 includes a protrusion, shown as boss 120, fixedly coupled to the frame 100. The boss 120 is pivotably coupled to a first mount or bracket, shown as bracket 122. The bracket 122 includes a plate 124 that extends horizontally (i.e., parallel to a horizontal plane). A pair of protrusions 126 extend vertically, perpendicular to a top surface of the plate 124. The bracket 122 may include one or more gussets or bracings that extend between the protrusions 126 and the plate 124, increasing the strength of the bracket 122. The protrusions extend 126 on either side of the boss 120 and each define an aperture that corresponds with the aperture defined by the boss 120.

A pin 128 extends through the apertures in the boss 120 and the protrusions 126, defining a laterally-extending axis about which the front cabin 20 pivots relative to the bracket 122. As shown, the pin 128 extends through one pivot mount 110. In other embodiments, the pin 128 extends across the full width of the vehicle 10 and through a boss 120 and a pair of protrusions 126 of the other pivot mount 110. The pivot mount 110 further includes a retaining pin 129 extending through an aperture in the pin 128 and oriented approximately perpendicular to the pin 128. The retaining pin 129 is captured in place by a bolt extending through the retaining pin 129 and into the bracket 122. The retaining pin 129 prevents rotational and sideways movement of the pin 128, while still facilitating disassembly.

A second mount or bracket, shown as bracket 130, includes a side plate 132 fixedly coupled to a top plate 134. The side plate 132 extends along and is coupled to an outside vertical surface of the frame rail 108. The top plate 134 extends horizontally, extending partially along a top surface of the frame rail 108. This improves the blast resistance of the vehicle 10, as an explosion originating under the frame 12 may cause the frame 12 to move upward, pressing against the top plate 134 and transferring the load into the pivot mount 110. A series of ribs 136 extend between the top plate 134 and the side plate 132, increasing the strength of the bracket 130. A front plate 138 may be coupled to the ribs 136 and the top plate 134 opposite the side plate 132.

The bracket 122 is coupled to the bracket 130 by a pair of isolators 140. Specifically, the isolators 140 extend along a top surface of the bracket 122 and directly between the bracket 130 and the bracket 122. The isolators 140 may be made from rubber or another material that absorbs energy and elastically deforms under a compressive loading. In some embodiments, the isolator is made from a reinforced composite material. Accordingly, the isolators 140 dampen any vibration passing from the frame 12 into the front cabin 20, stabilizing the front cabin 20 and reducing road noise experienced by the occupants. The plate 124 of the bracket 122 and the top plate 134 of the bracket 130 each define a pair of corresponding apertures, through which a pair of fasteners 142 pass. The isolators 140 are arranged such that each fastener 142 passes through one isolator 140. The fasteners 142 couple the isolators 140 and the bracket 122 to the bracket 130, preventing the bracket 122 from being lifted away from the bracket 130. The isolators 140 may be approximately symmetrically arranged longitudinally about the pin 128. This symmetrical arrangement facilitates uniform loading of both of the isolators 140, improving the vibration dampening, the stability, and the noise isolation of the pivot mount 110. Additionally, this arrangement of the pivot mount 110 facilitates the use of many of the same parts on both sides of the vehicle 10, lessening the number of unique parts in the vehicle 10.

Figure 8:
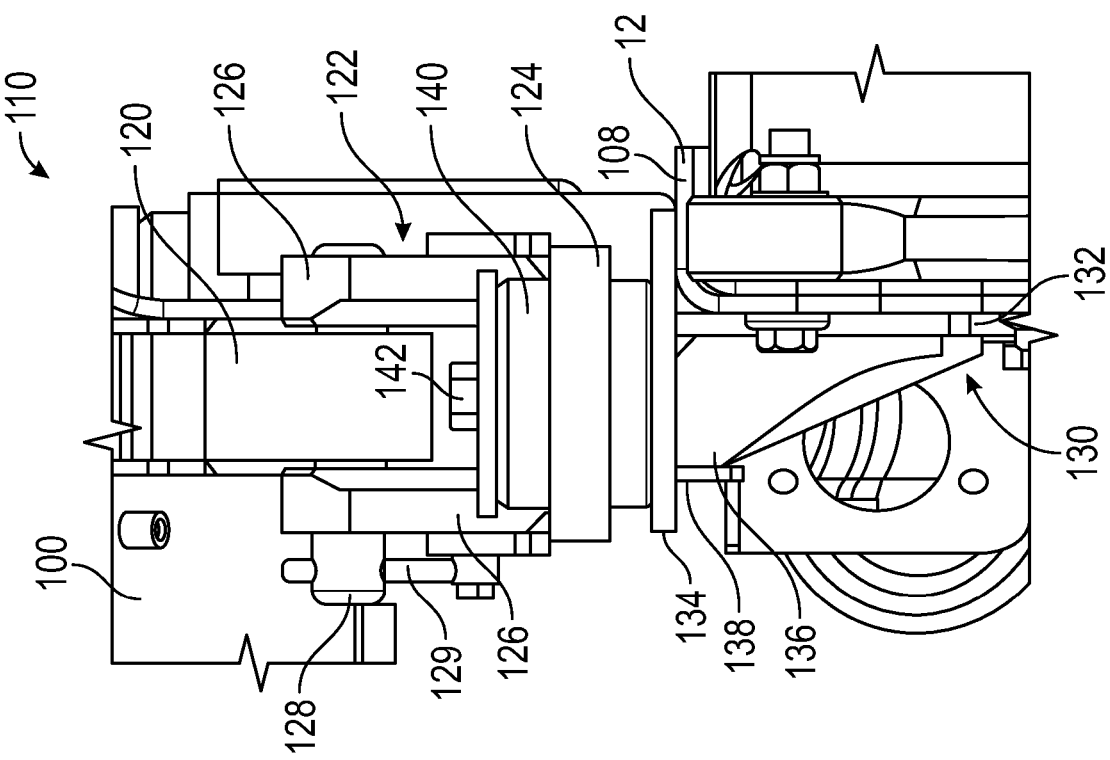
FIG. 8 is a front view of the pivot mount of FIG. 7.
Figure 7:
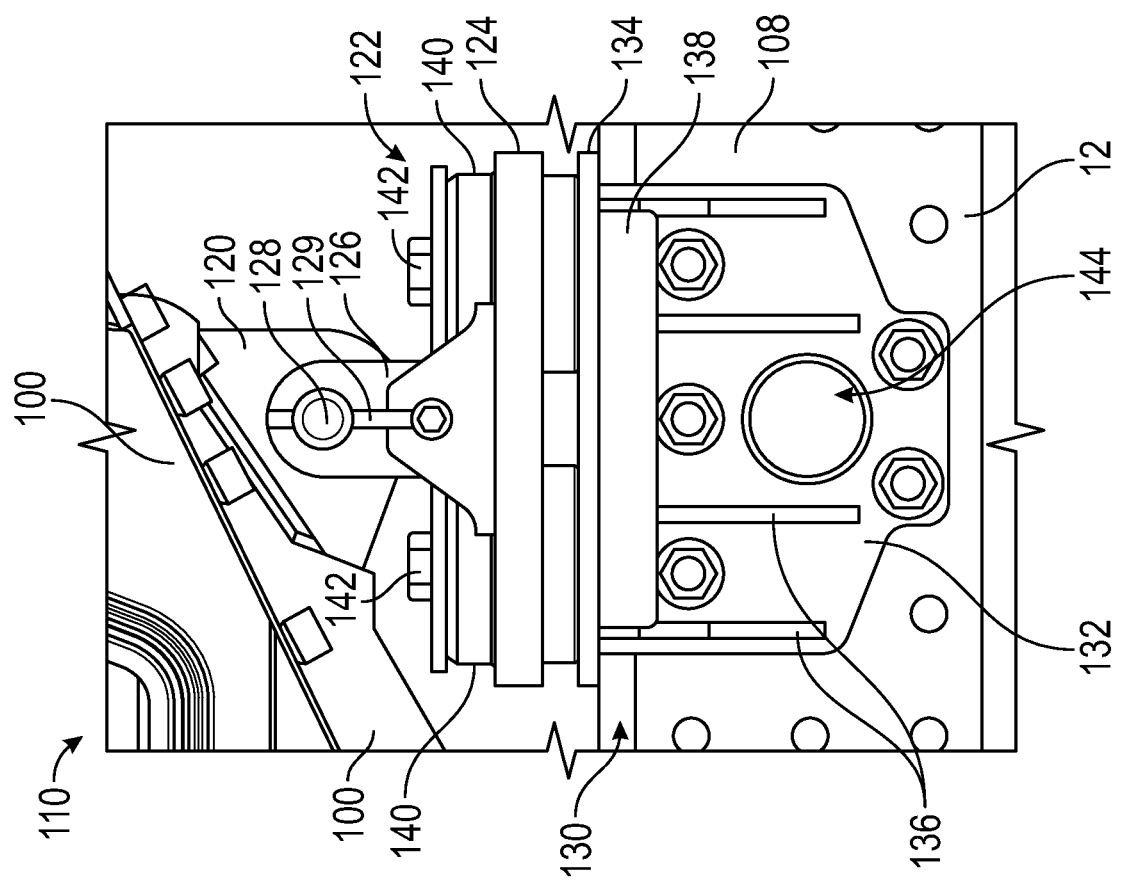
FIG. 7 is a side view of a pivot mount of the vehicle of FIG. 1, according to an exemplary embodiment.
Figure 13:
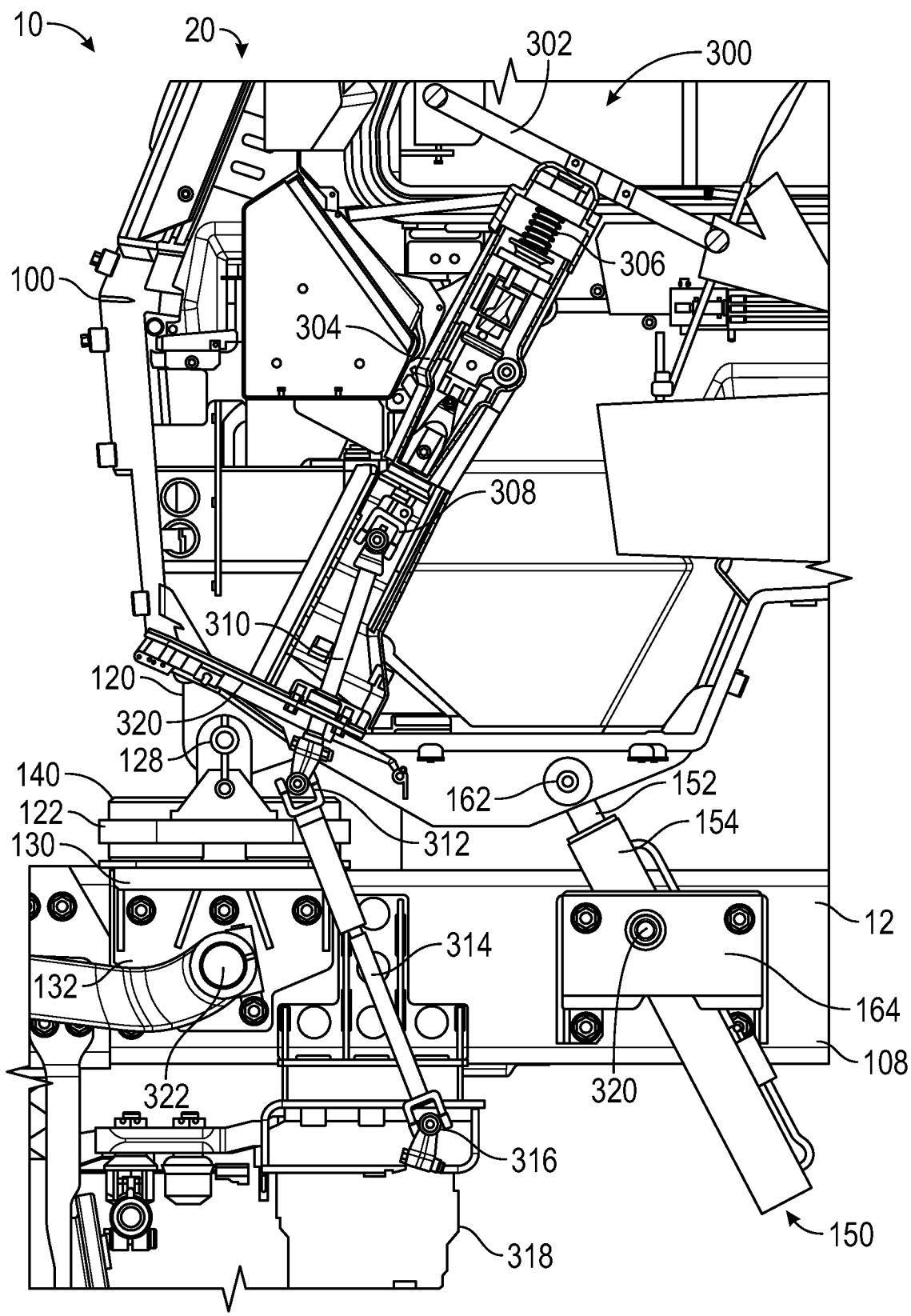
FIG. 13 is a section view of a steering assembly of the vehicle of FIG. 1, according to an exemplary embodiment.

Referring to FIGS. 7 and 8, the vehicle 10 may include one or more protrusions, such as the anti-sway bar 322 of FIG. 13, extending laterally outward from the frame 12. Specifically, the front cabin 20 is located such that the anti-sway bar 322 is located directly beneath the axis about which the front cabin 20 rotates (e.g., directly beneath the pin 128). To prevent the anti-sway bar 322 from interfering with the pivot mount 110, the side plate 132 defines an aperture 144, through which the anti-sway bar 322 extends. The aperture 144 may be slightly larger than the diameter of the anti-sway bar 322 to facilitate movement of the anti-sway bar 322 relative to the pivot mounts 112. As shown in FIG. 13, the side plate 132 surrounds the anti-sway bar 322, increasing the blast resistance of the pivot mount 110. In a blast event, the anti-sway bar 322 resists translation of the bracket 130 (e.g., vertically, longitudinally, etc.) that would impart a shear force on the anti-sway bar 322. The side plate 132 is additionally shaped to avoid other components on the surface of the frame 12. In other embodiments, a portion of the bracket 130 is cut away such that the side plate 132 does not surround the anti-sway bar 322.

Referring to FIGS. 7 and 8, the isolators 140 are positioned atop the top plate 134 of the bracket 130. This facilitates clearance of other components below the top plate 134. In other embodiments, the isolator 140 extends along a top surface and a bottom surface of the top plate 134. Each isolator 140 may be split (e.g., formed in two separate pieces) to facilitate placement on either side of the top plate 134 or the plate 124 during assembly.

in other embodiments, the front cabin 20 is otherwise pivtoably coupled to the frame 12. By way of example, a side plate may be coupled to the frame rail 108. A middle link may be pivotably coupled to both the side plate and the boss 120 (e.g., with pins). The middle link may then rest atop an isolator that is coupled to a top surface of the frame rail 108.

Figure 9:
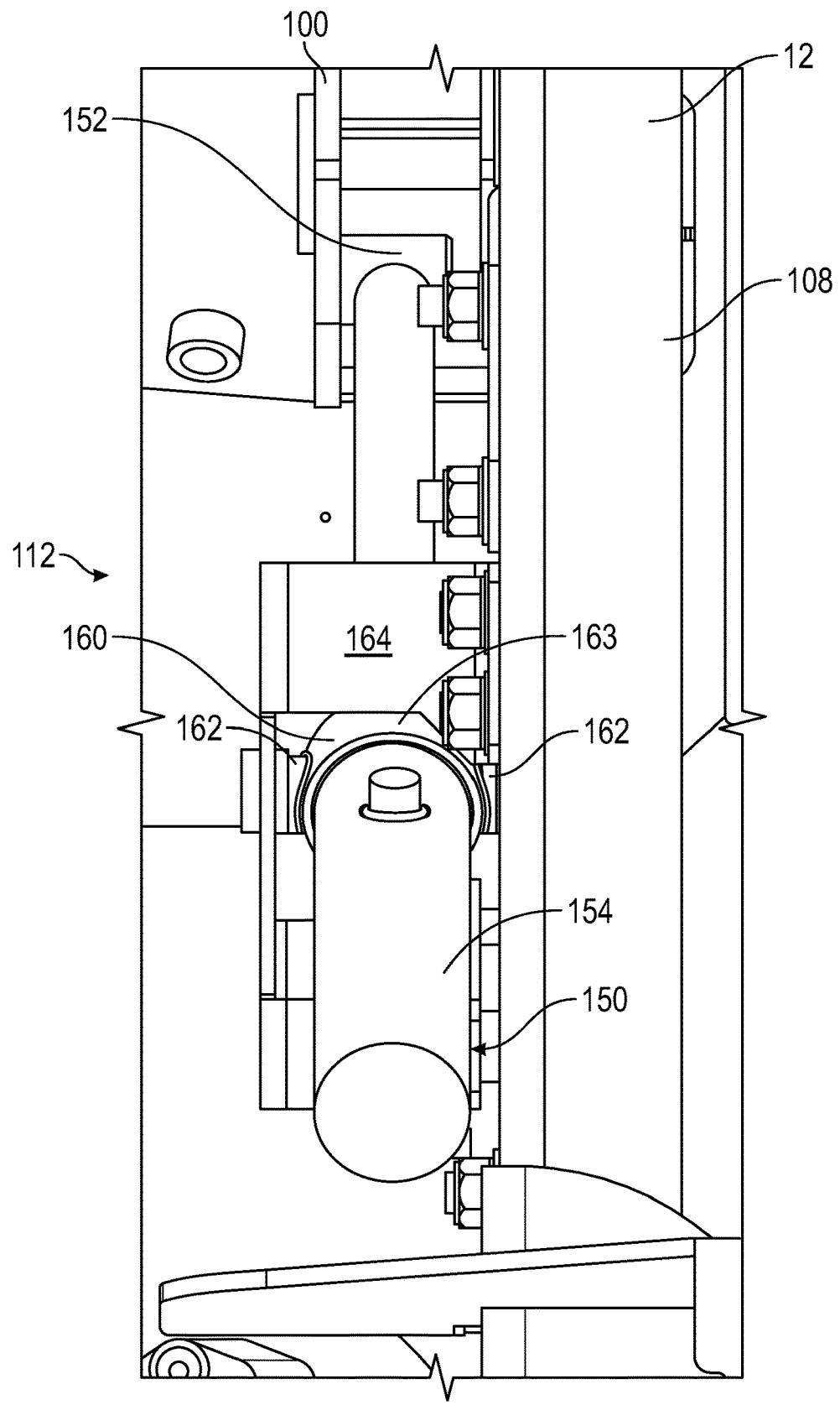
FIG. 9 is a bottom view of a lift assembly of the vehicle of FIG. 1, according to an exemplary embodiment.
Figure 11:
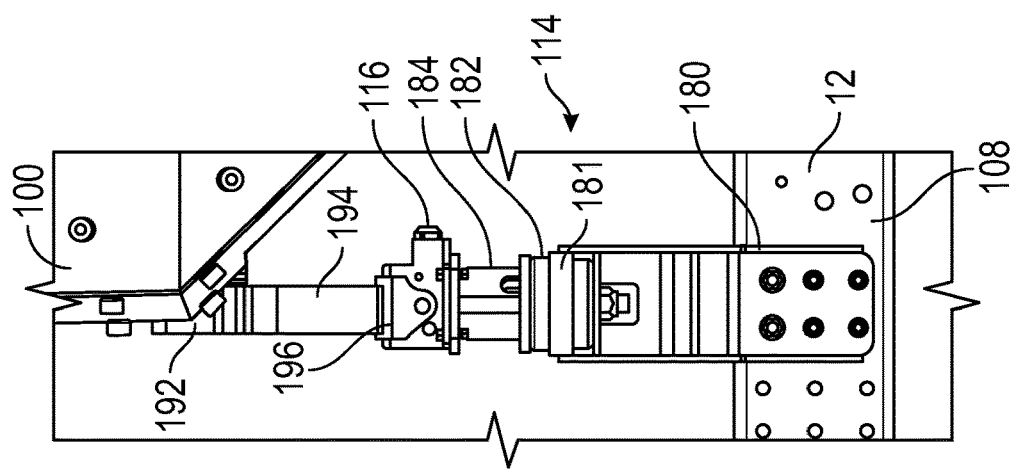
FIG. 11 is a side view of one of the rear supports and the bridge support of FIG. 10.
Figure 10:
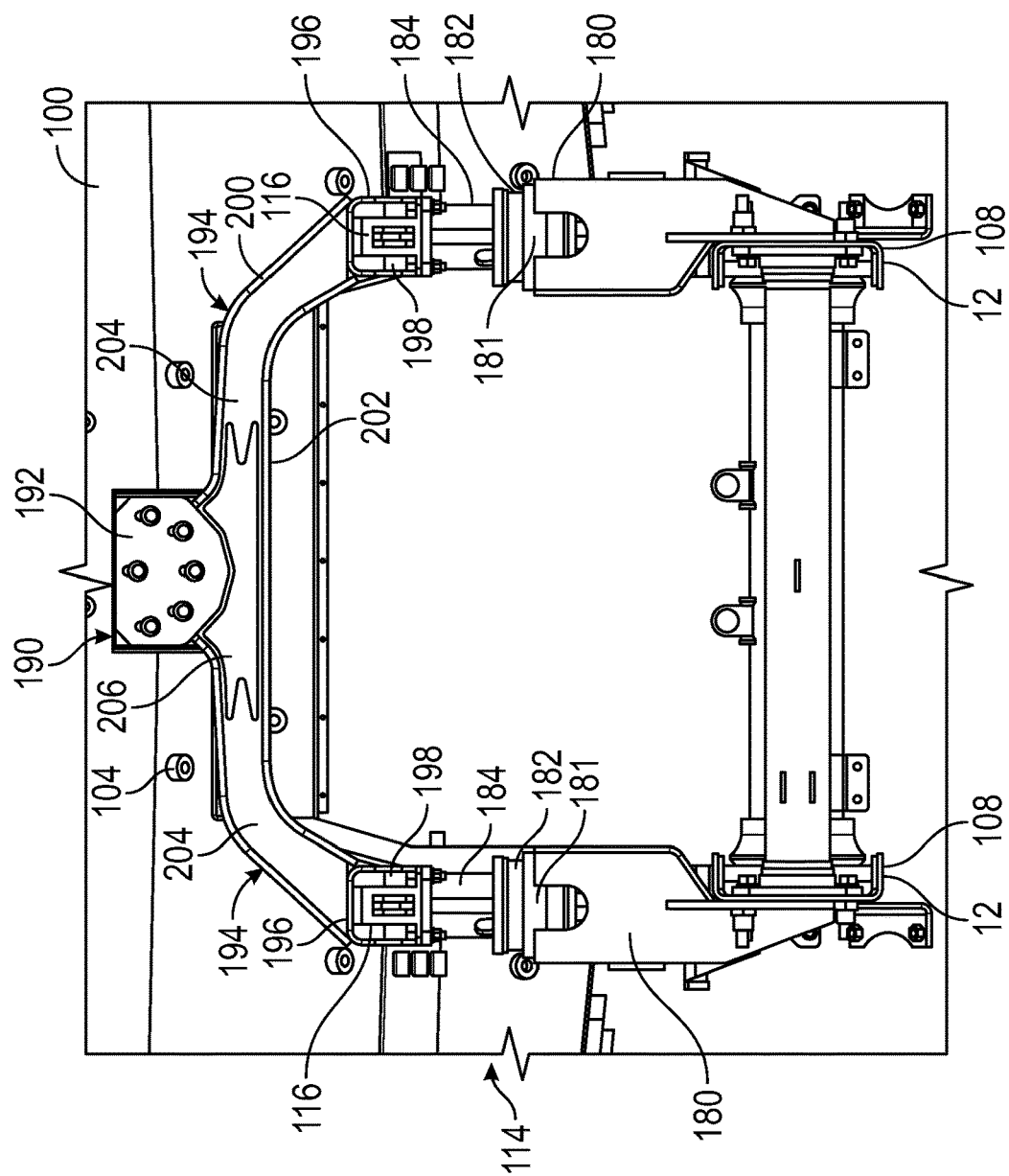
FIG. 10 is a rear view of a pair of rear supports and a bridge support of the vehicle of FIG. 1, according to an exemplary embodiment.

Referring to FIGS. 5, 6, and 9, the lift assembly 112 is shown according to an exemplary embodiment. The lift assembly 112 includes a linear actuator, shown as hydraulic cylinder 150. The hydraulic cylinder 150 includes a rod 152 and a cylinder body 154, and as the hydraulic cylinder 150 extends, the rod 152 extends from the cylinder body 154. The hydraulic cylinder 150 may be single or double acting. The vehicle 10 may include valves, pumps, reservoirs, and/or other hydraulic components required to actuate the hydraulic cylinder. In other embodiments, the hydraulic cylinder 150 is instead an electrically or pneumatically powered actuator.

An end of the rod 152 is pivotably coupled to the underside of the frame 100 by a pin 156. The frame 100 may include a pair of bushings or bearings configured to receive the pin 156. The pin 156 may be spaced rearward from the pin 128 of the pivot mount 110 to improve the mechanical advantage of the hydraulic cylinder 150 and reduce the force required to rotate front cabin 20. Portions of the front cabin 20 may be arranged to accommodate the locations of the bushings. The hydraulic cylinder 150 includes a trunnion mount 160 disposed partway along the length of the cylinder body 154. The trunnion mount 160 includes a pair of round protrusions 162 extending laterally from opposite sides a collar 163, which encircles and is coupled to the cylinder body 154. One protrusion 162 is received by an aperture defined in the side of the frame rail 108, and the other protrusion 162 is received by a mount or bracket 164. The bracket 164 is coupled to a vertical outside surface of the frame rail 108 and at least partially surrounds the hydraulic cylinder 150. The bracket 164 and/or the frame rail 108 may include bushings or bearings that receive the protrusions 162. The trunnion mount 160 facilitates spacing the hydraulic cylinder 150 away from the rail of the frame 12 such that other components may extend between the hydraulic cylinder 150 and the rail of the frame 12.

The hydraulic cylinder 150 is configured to pivot about a lateral axis extending through the center of both protrusions 162. Hydraulic fluid may be pumped into an extension chamber of the hydraulic cylinder 150 to extend the hydraulic cylinder 150, rotating the front cabin 20 toward the maintenance position. The hydraulic cylinder 150 applies a force about the axis of rotation of the front cabin 20 (e.g., defined by the pins 128) on an effective lever or moment arm extending perpendicular to the hydraulic cylinder 150. The trunnion mount 160 facilitates having a much longer effective lever arm than an arrangement where a cap end (i.e., an end opposite the rod 152) of the cylinder body 154 is coupled to the frame rail 108, as it facilitates lowering the cylinder body 154. A longer effective lever arm reduces the required hydraulic pressure to lift the front cabin 20, facilitating the front cabin 20 being much heavier (e.g., due to added armor) without compromising the cabin lifting performance of the hydraulic cylinders 150. When returning the front cabin to the use position, the weight of the front cabin 20 applies a compressive force on the hydraulic cylinder 150, forcing fluid out of the extension chamber. Alternatively, the hydraulic cylinder 150 may be double acting, and the retraction of the hydraulic cylinder 150 may be powered.

Referring to FIGS. 5, 6, 10, and 11, the rear support 114 is shown according to an exemplary embodiment. The rear support 114 may be configured to support the loading caused by the addition of armor panels, mounted guns, and/or other components to the front cabin 20. The rear support 114 includes a bracket 180 coupled to an outer vertical surface of the frame rail 108. The bracket 180 extends upwards, terminating in a horizontal plate 181. A portion of the rear support 114 extends directly above the frame rail 108, increasing the blast resistance of the rear support to an explosion originating under the vehicle 10. An isolator 182, which may be substantially similar to the isolators 140, extends both above and below the horizontal plate 181 of the bracket 180. A bracket, shown as extension 184, is coupled to a top surface of the isolator 182. In some embodiments, a fastener extends through the isolator 182, the horizontal plate 181, and a portion of the extension 184, coupling the isolator 182, the bracket 180, and the extension 184 together. The height of the extension 184 may vary depending on the distance between the frame rail 108 and the front cabin 20 and the sizes of the other components in the rear support 114. A latch 116 is coupled to the top end portion of the extension 184. The latch 116 may be one or more of electrically, hydraulically, pneumatically, or passively actuated.

The frame 100 is coupled to a support, shown as a bridge support 190. The bridge support 190 includes a main body 192 and a pair of arms 194 extending laterally outward from the main body 192. The main body 192 may be fastened to the rear of the frame 100 and positioned along the longitudinal centerline of the vehicle 10. The arms 194 extend laterally outward and then downwards, defining a space between the vertically-extending portions of the arms 194. The space may facilitate a lower position of the front cabin 20 when other components (e.g., the primary driver) would otherwise interfere with the bridge support 190. The arms 194 terminate in a bracket, shown as a foot 196, that forms a downward-opening U shape. A latch bolt is coupled to and extends horizontally through the foot 196, passing across the opening of the foot 196. Each latch bolt 198 is configured to be received by the latch 116 of one of the rear supports 114. When the front cabin 20 moves from the maintenance position to the use position, the latch bolts 198 are received by the latches 116, locking the front cabin 20 in the use position. In order to move the front cabin 20 from the use position to the maintenance position, the latches 116 may be disengaged to release the latch bolts 198, allowing the hydraulic cylinders 150 to extend.

The arms 194 of the bridge support 190 may include an upper plate 200, a lower plate 202, and one or more web plates 204 extending between the upper plate 200 and the lower plate 202. In some embodiments, the lower plates 202 of the arms 194 are integrally formed from a single plate. The arms 194 may include multiple web plates 204 that are spaced apart such that a cavity is formed inside the bridge support 190. The upper plates 200 and the web plates 204 are coupled to the main body 192. The bridge support 190 includes a rib 206 extending between the upper plates 200, the main body 192, and the lower plates 202. The rib 206 may be located between or outside of the web plates 204. This rib 206 increases the strength of the bridge support 190 to facilitate supporting more weight with the front cabin 20. The lengths of the main body 192 and the vertical portions of the arms 194 may be varied to facilitate clearance around other components (e.g., the primary driver, armor panels 102, etc.). The distance between the upper plates 200 and lower plate 202 may be increased to increase the strength of the bridge support 190. In other embodiments, the main body 192 may extend down to meet the lower plate 202.

In an alternative embodiment, the arms 194 of the bridge support 190 are pivotably coupled to the main body 192. By way of example, the main body 192 may define a first longitudinally-extending aperture. The arms 194 may form a single structure separate from the main body 192 and defining a second longitudinally-extending aperture. A pin may extend through both apertures, pivotably coupling the main body 192 to the arms 194. This facilitates pivoting of the arms 194 to accommodate uneven loading, reducing bending stresses on the front cabin 20.

In other embodiments, the rear supports 114 each include a linear actuator, such as a hydraulic cylinder, that extends between the bracket 180 and the latch 116. The linear actuator may be arranged vertically such that a rod of the linear actuator extends upwards. The linear actuators may be extended upward to apply a lifting force on the front cabin 20. The linear actuators may also be extended or retracted to adjust the orientation of the front cabin (e.g., such that the front cabin is made level). When the front cabin 20 is moved from the use position to the maintenance position, the latches 116 may release the latch bolts 198, and the linear actuators may be extended. The extension of the linear actuators would facilitate movement of the front cabin 20 under high loads (e.g., when the front cabin 20 is armored) or when the lift assemblies 112 have relatively short effective lever arms. The linear actuators and the hydraulic cylinders 150 may be timed relative to one another (e.g., made to operate in a certain sequence) to maximize the effectiveness of the linear actuators.

Figure 12:
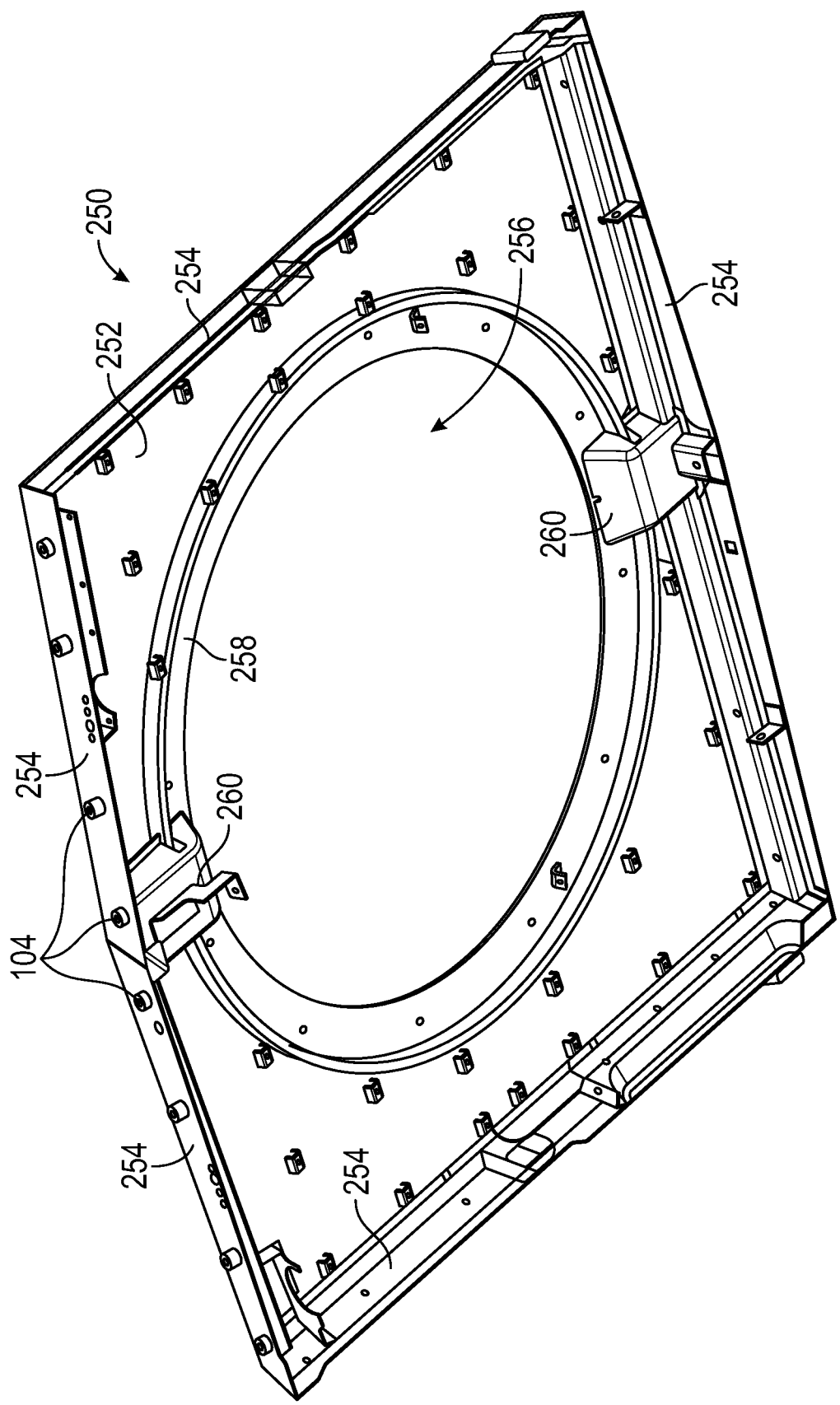
FIG. 12 is bottom perspective view of a roof of the front cabin of FIG. 2, according to an exemplary embodiment.

Referring to FIG. 12, a roof 250 of the frame 100 of the front cabin 20 is shown according to an exemplary embodiment. The roof 250 includes a plate, shown as a top plate 252, that defines a top surface of the frame 100. A number of flanges 254 extend downward from the top plate 252, facilitating a coupling of the top plate 252 to the walls of the front cabin 20. Some of the flanges 254 may include extensions to which weapons (e.g., rifles) may be secured. An aperture 256 is defined near the center of the top plate 252. A turret ring 258 is coupled to the top plate 252 and extends along the outside of the aperture 256. The turret ring 258 is supported by a pair of bosses 260 extending from the flanges 254 towards the turret ring 258. Specifically, a first boss 260 extends from the front end of the roof 250 to the turret ring 258 and a second boss 260 extending from the rear end of the roof 250 to the turret ring 258. In other embodiments, the roof 250 includes more or fewer bosses 260 and/or gussets or ribs to strengthen the roof 250. The turret ring 258 is incorporated into the structure of the roof 250, stiffening the roof 250. This facilitates having fewer components disposed beneath the top plate 252, increasing the headroom inside of the front cabin 20. The turret ring 258 is positioned close enough to the top plate 252 to facilitate clearance between the turret ring 258 and any rifles secured to the roof 250. The turret ring 258 may serve as a bearing surface for a turret (e.g., a gun turret, the turret assembly 610) mounted to the roof 250. The aperture 256 and the turret ring 258 may be of sufficient diameter (e.g., greater than shoulder width) to facilitate access to the turret from the interior of the front cabin 20. By way of example, the aperture 256 may be larger than a torso of an operator.

In an alternative embodiment, the roof 250 includes a central top 252 plate and a series of top plates 252 angled upward toward the central top plate 252. The angled top plates 252 are coupled to the central top plate 252 on one side and to the flanges 254 on the opposite side. The central top plate 252 define the aperture 256 and receive the turret ring 258. The angled top plates 252 plates are angled slightly upward (e.g., 5 degrees, 10 degrees, etc.). This arrangement facilitates the deflection of bullets off of the angled top plates 252, increasing the protection afforded by the vehicle 10.

Referring to FIG. 13, a steering system 300 of the vehicle 10 is shown. The steering system 300 includes a steering wheel 302 coupled to a steering column 304, a first shaft 306, a first universal joint 308, a second shaft 310, a second universal joint 312, a third shaft 314, a third universal joint 316, and a steering box 318, each coupled to one another in series. Turning the steering wheel 302 rotates the universal joints and the shafts, which in turn rotates an input to the steering box 318. The steering box 318 actuates the other steering components of the vehicle 10 to steer the vehicle 10 in response to an input to the steering wheel 302. The shafts and the steering column 304 may be arranged to minimize the angular displacement of the universal joints. The second universal joint 312 facilitates rotation of the front cabin 20 relative to the frame 12. A bulkhead panel 320 is located partially along the length of the second shaft 310. The bulkhead panel 320 supports the second shaft 310 while still facilitating uninhibited rotation of the second shaft 310. The bulkhead panel 320 seals the front cabin 20 around the second shaft 310, increasing the blast resistance of the front cabin 20. Additional bulkhead panels may be utilized for other components (e.g., wires, hydraulic lines, etc.). In some embodiments, a wire will terminate at a bulkhead panel in an electrical connector, which is in turn connected to a wire on the interior of the front cabin 20, further increasing the blast resistance of the front cabin 20. An anti-sway bar 322 is rotatably coupled to the frame 12. The anti-sway bar 322 extends through the aperture 144 defined in the bracket 130. The anti-sway bar 322 is coupled to opposing ends of the front tractive assembly 40 and opposes vertical motion of one of the frontmost tractive elements 44 relative to the other of the frontmost tractive elements 44.

Seat Arrangement

Figure 14:
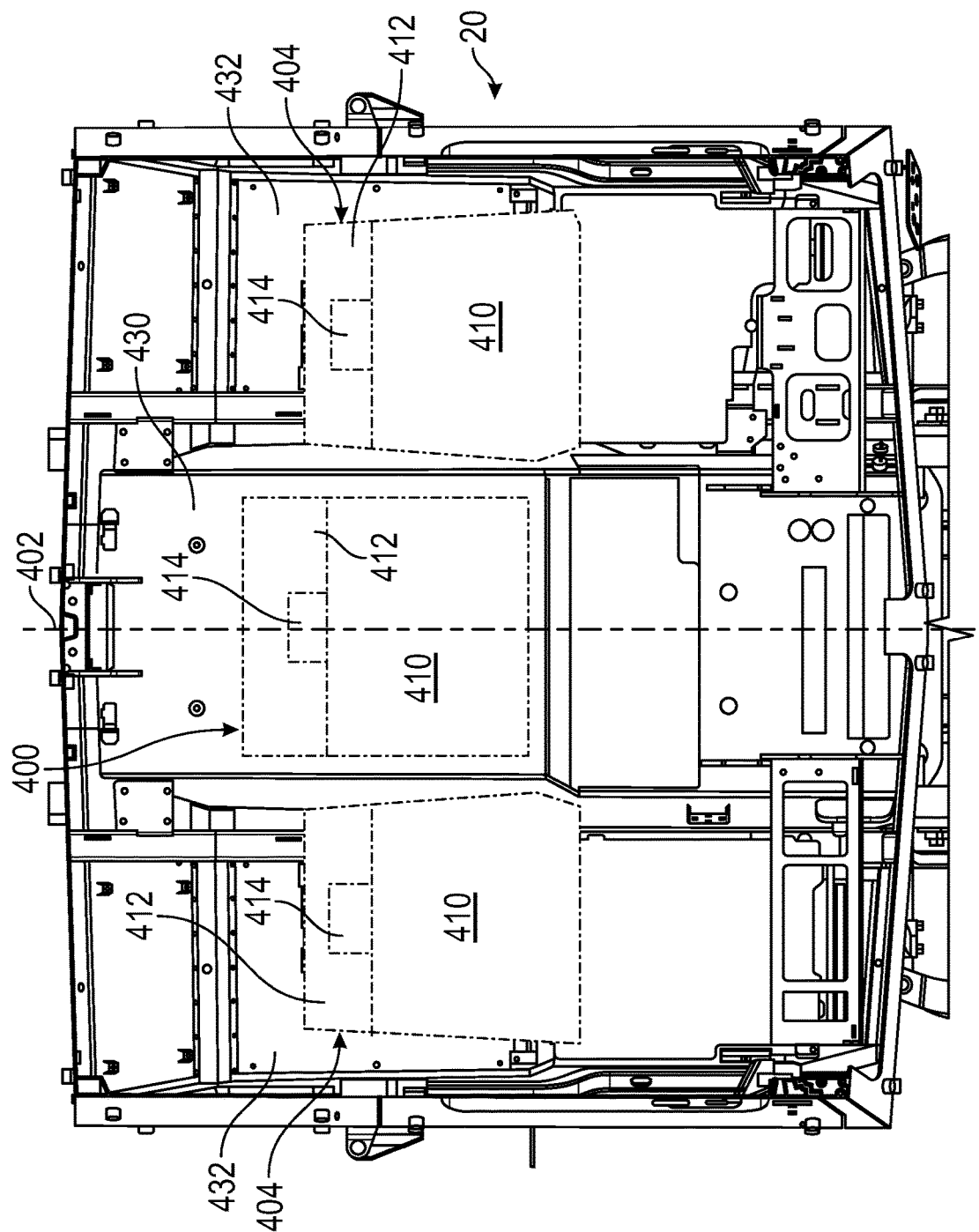
FIG. 14 is a top view an interior of the front cabin of FIG. 2, according to an exemplary embodiment.
Figure 15:
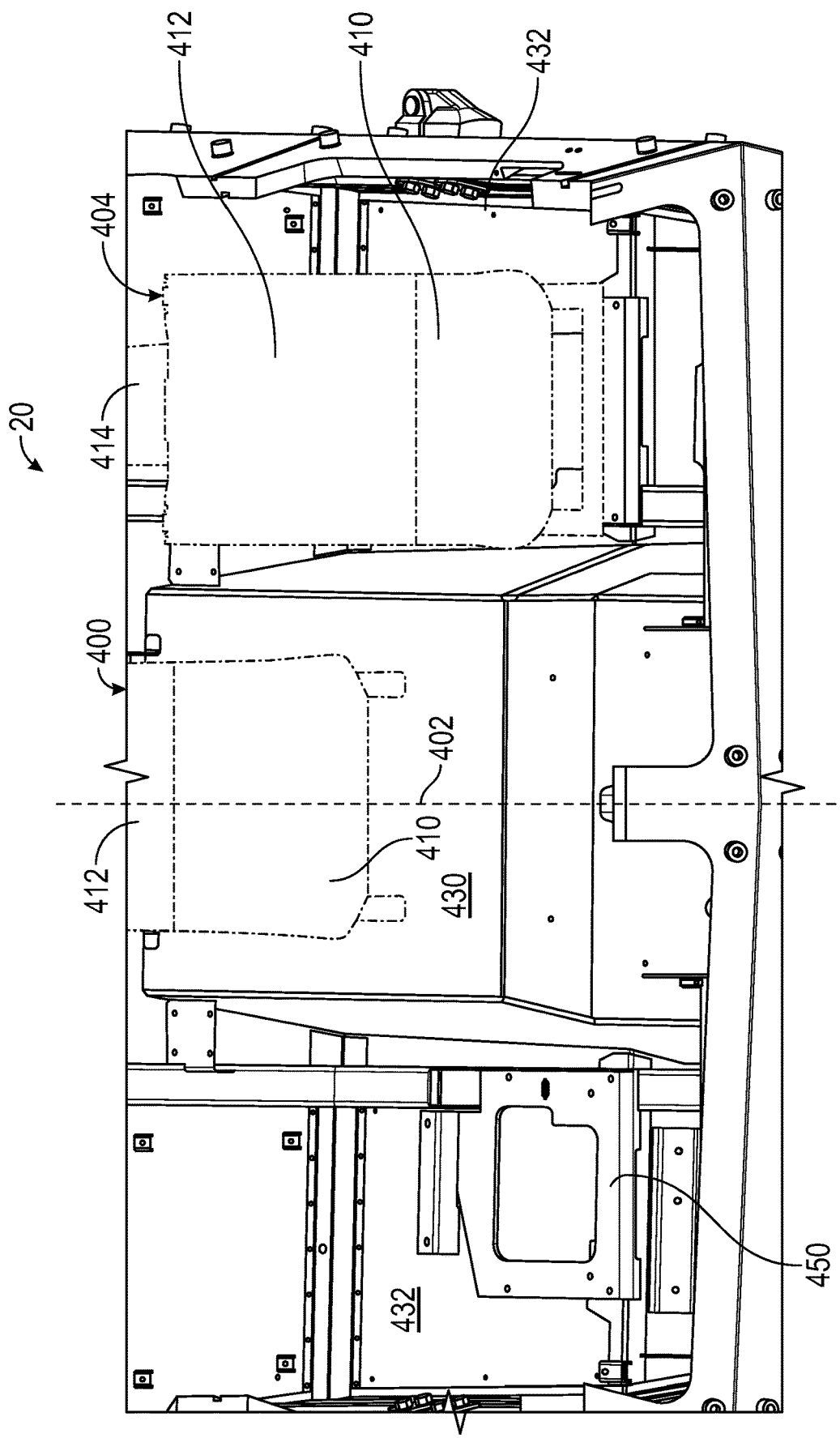
FIG. 15 is a perspective view the interior of FIG. 14.
Figure 16:
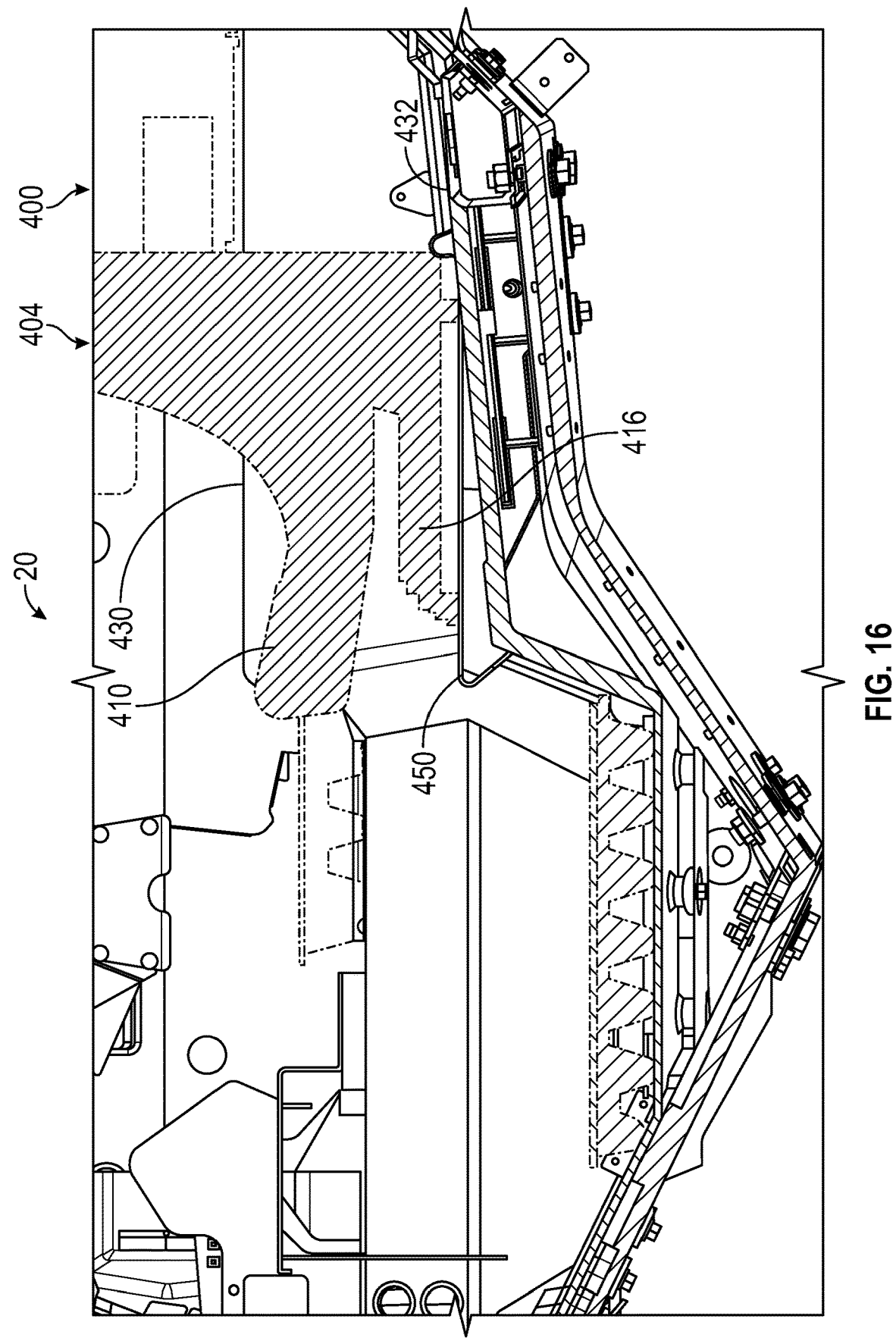
FIG. 16 is a side section view of the front cabin of FIG. 2.
Figure 17:
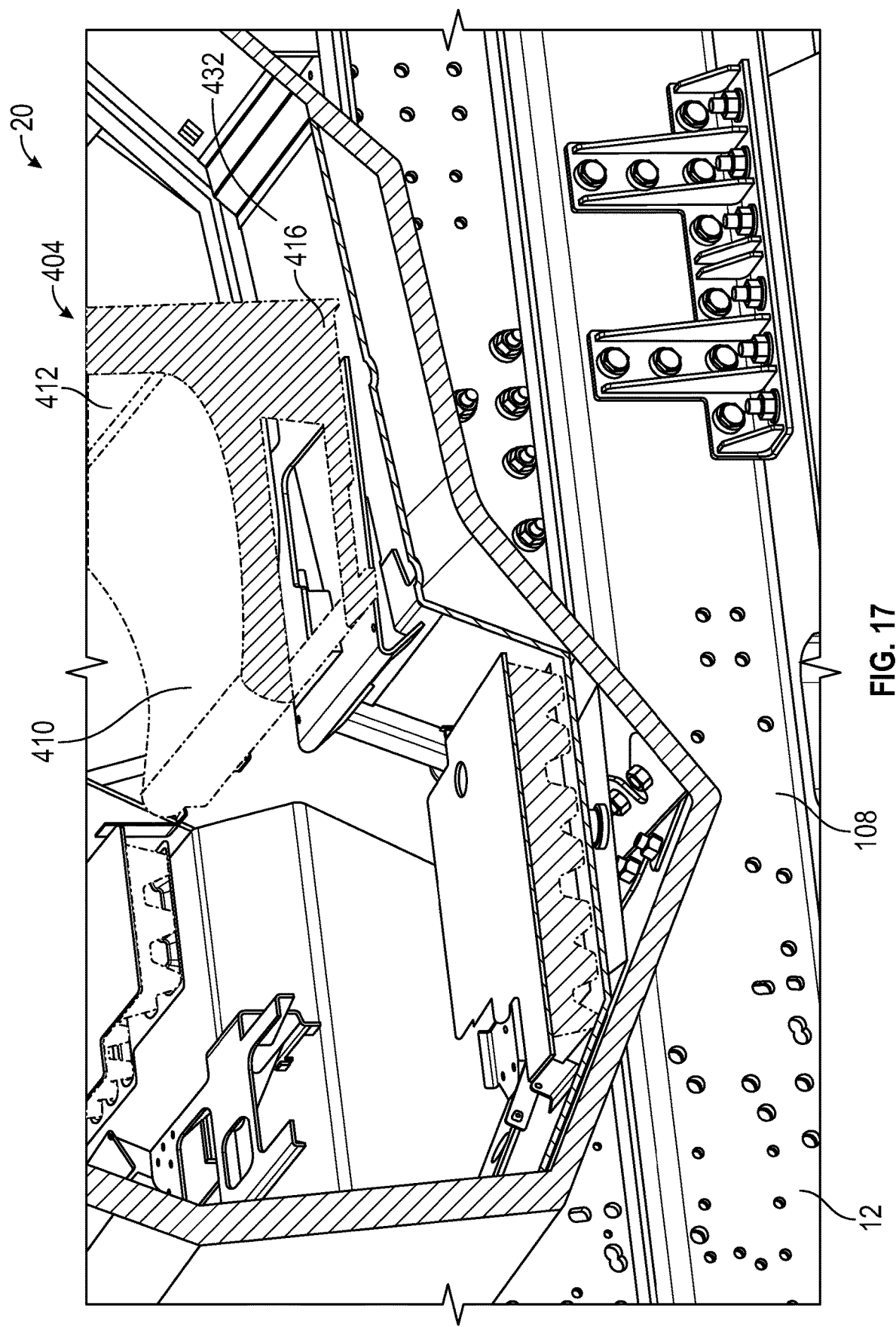
FIG. 17 is a perspective section view of the front cabin of FIG. 2.
Figure 18:
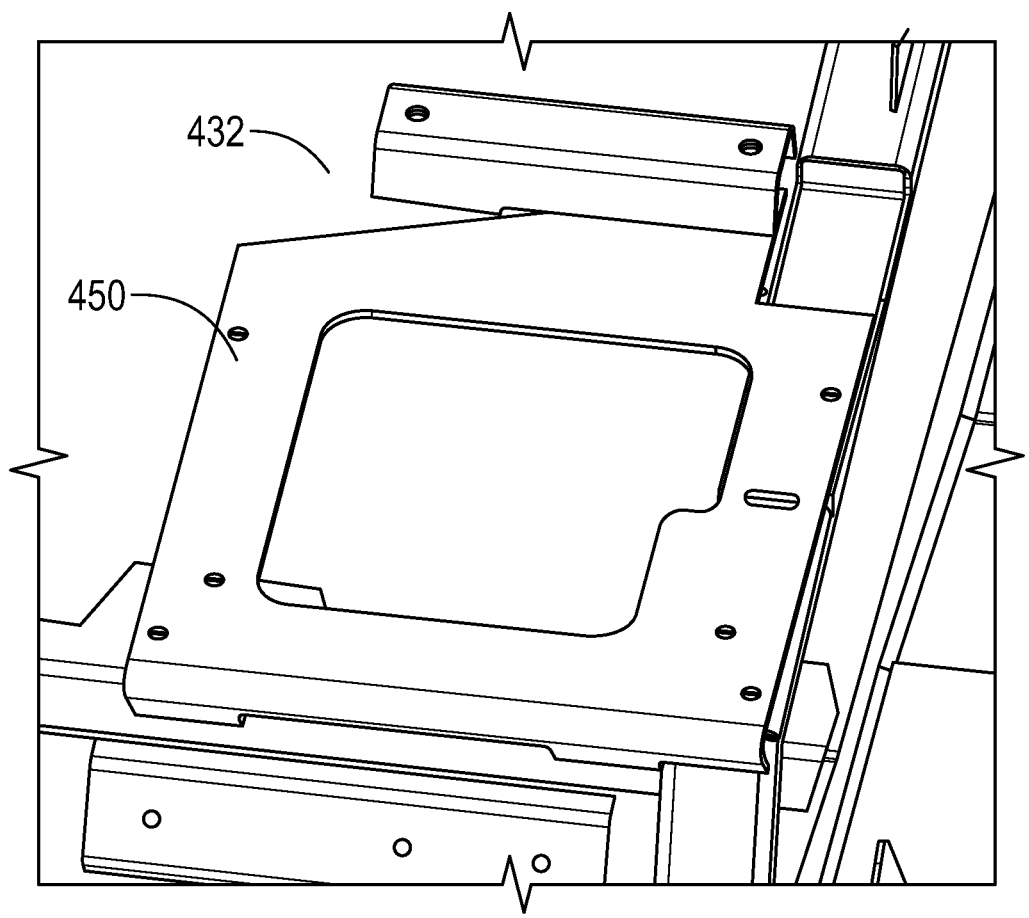
FIG. 18 is a perspective view of a mounting bracket for a seat of the front cabin of FIG. 2, according to an exemplary embodiment.

Referring to FIGS. 14 and 15, an interior of the front cabin 20 is shown. The front cabin 20 includes a seat, shown as center seat 400, disposed along a longitudinal centerline 402 of the vehicle 10. A pair of seats, shown as side seats 404, are arranged symmetrically on either side of the longitudinal centerline 402. The center seat 400 and each side seat 404 are arranged such that the center seat 400 supports a gunner, one side seat 404 supports a driver, and the other side seat 404 supports a passenger. Each seat includes a seat bottom 410 configured to support an occupant's bottom, a seat back 412 configured to support an occupant's back, and a headrest 414 configured to support an occupant's head, neck, and/or upper back. As shown in FIGS. 16 and 17, each seat includes a frame 416 that supports the seat bottom 410, the seat back 412, and the headrest 414. The seat bottom 410 may be oriented substantially parallel to a horizontal plane when folded down. The seat back 412 may be angled relative to a vertical plane (e.g., 10 degrees, 15 degrees, 20 degrees, etc.) or may be oriented substantially parallel to a vertical plane. The headrest 414 may be oriented substantially parallel to a vertical plane.

The front cabin 20 includes a floor having a first floor section, shown as center floor section 430, that is disposed along the longitudinal centerline 402. The front cabin 20 also includes a pair of second floor sections, shown as side floor sections 432, arranged symmetrically on either side of the longitudinal centerline 402. The center floor section 430 is raised relative to each side floor section 432 (e.g., to facilitate access to a turret assembly, to provide a tunnel for a primary driver of the vehicle 10, etc.). The frames 416 of the side seats 404 are coupled to the side floor sections 432 with mounting brackets 450, as shown in FIGS. 15-18. The mounting bracket 450 may be shaped to position the side seat 404 in a desired orientation.

Figure 19:
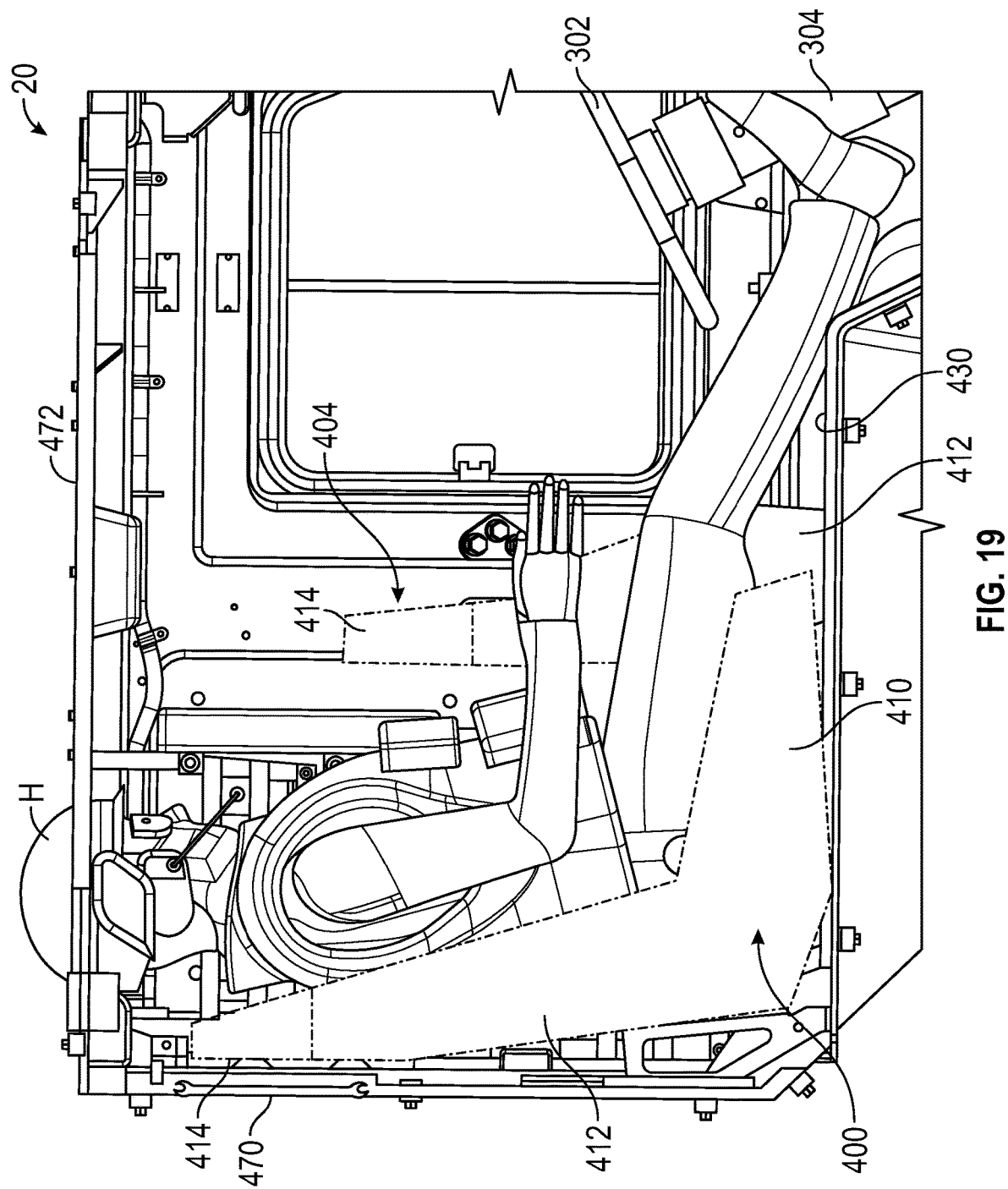
FIG. 19 is a side view of an occupant in a seat of the front cabin of FIG. 2, according to an exemplary embodiment.

Conventionally, the center seat 400 would be coupled (e.g., bolted, etc.) to a rear wall 470 of the front cabin 20, as shown in FIG. 19. This specific coupling prevents the center seat 400 from moving along the longitudinal centerline 402. With the center floor section 430 raised, this positioning can result in reduced headroom for the gunner. As shown in FIG. 19, with the center seat 400 in this arrangement, a gunner may experience interference between their head H and a roof 472 of the front cabin 20 (e.g., the roof 250) while seated in the center seat 400.

Figure 20:
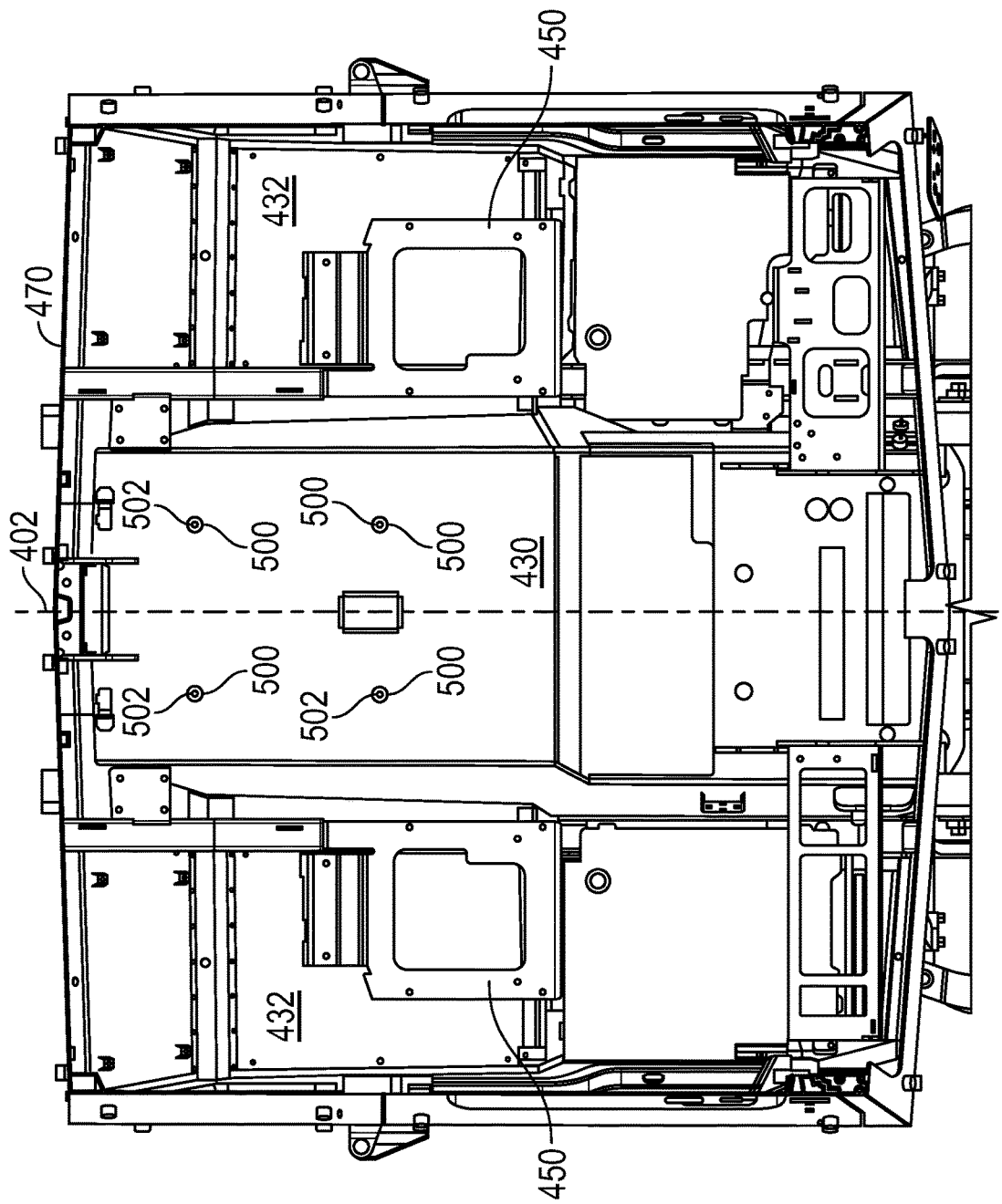
FIG. 20 is another top view the interior of FIG. 14.
Figure 21:
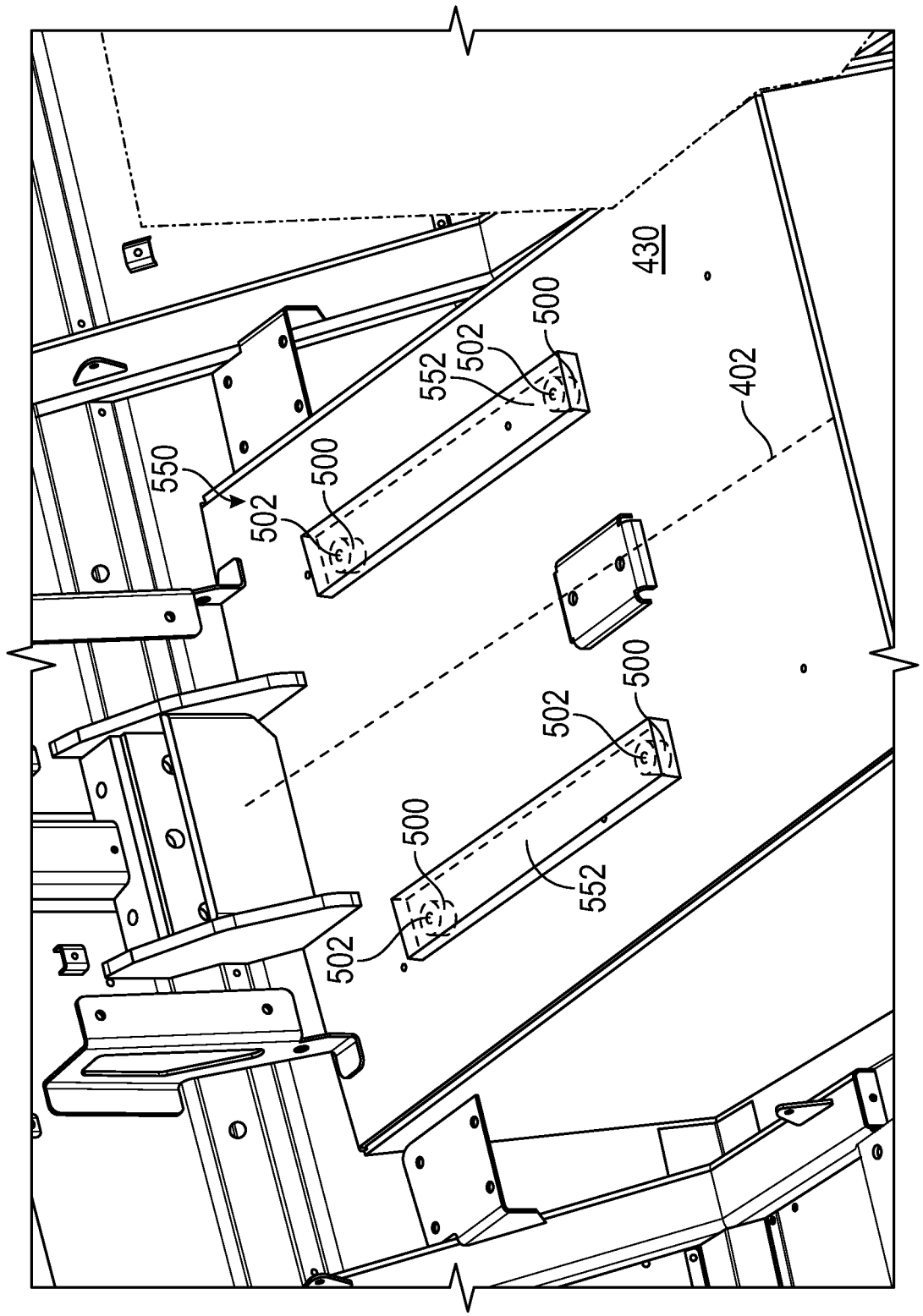
FIG. 21 is a perspective view of a floor section of the front cabin of FIG. 2, according to an exemplary embodiment.

Referring to FIGS. 20 and 21, instead of the center seat 400 being coupled to the rear wall 470, the center seat 400 is coupled to the center floor section 430. A series of bosses 500 are coupled to (e.g., received by, welded to, threaded into, etc.) the center floor section 430. The bosses 500 extend upwards from the center floor section 430 and each define a central aperture 502. The center seat 400 is slidably coupled to the bosses 500 with a rail system 550. The rail system 550 includes a rail 552 on each side of the longitudinal centerline 402, both of which extend parallel to the longitudinal centerline 402. In some embodiments, the rails 552 are arranged symmetrically about the longitudinal centerline 402. The rails 552 include a linear bearing or are otherwise configured to facilitate sliding motion. The rails 552 extend between, and are coupled to, each of the bosses 500 on either side of the longitudinal centerline 402. Each central aperture 502 may be threaded to facilitate a bolted connection between the rails 552 and the bosses 500. The frame 460 of the center seat 400 is coupled to the rails 552 to facilitate sliding movement of the center seat 400 between a use position and a stored position. The rail system 550 may include an interface (e.g., a lever, a button, etc.) to selectively engage a brake or lock to selectively prevent sliding movement of the center seat 400. In some embodiments, movement of center seat 400 between the use position and the stored position is driven by a motor.

Figure 22:
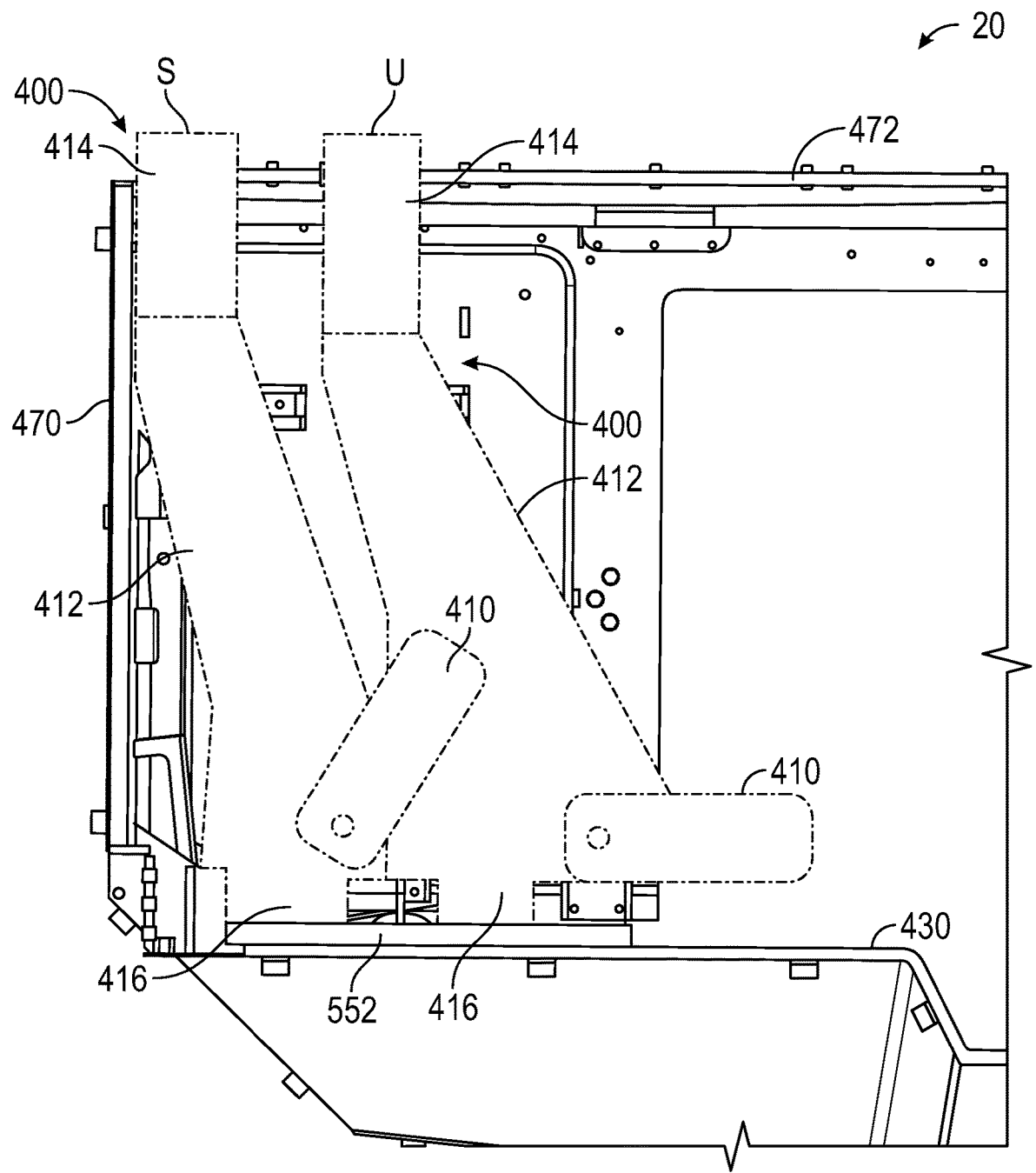
FIG. 22 is a side section view of the front cabin of FIG. 2 illustrating two positions of a seat, according to an exemplary embodiment.

Referring to FIG. 22, the stored position of the center seat 400 is indicated at reference S, and the use position of the center seat 400 is indicated at reference U. In the stored position, the center seat 400 is located proximate the rear wall 470 to facilitate unobstructed movement of the occupants throughout the front cabin 20. Additionally, this positioning leaves a significant portion of the center floor section 430 unobstructed, facilitating an occupant standing on the center floor section 430 to access the turret assembly 610 shown in FIGS. 23 and 24. The seat bottom 410 may be rotatably coupled to the frame 416 of the center seat 400 such that the seat bottom 410 can be rotated upwards, further reducing the size of the portion of the center floor section 430 obstructed by the center seat 400. As shown in FIG. 22, depending on the overall size of the center seat 400, the headrest 414 may interfere with the roof 472 and/or one or more protrusions extending from the roof 472 or the rear wall 470. The size and shape of the headrest 414 may be modified (e.g., as shown in FIG. 23) to fit below the roof 472 and/or protrusions and thereby facilitate moving the center seat 400 as close as possible to the rear wall 470 in the stored position.

Figure 23:
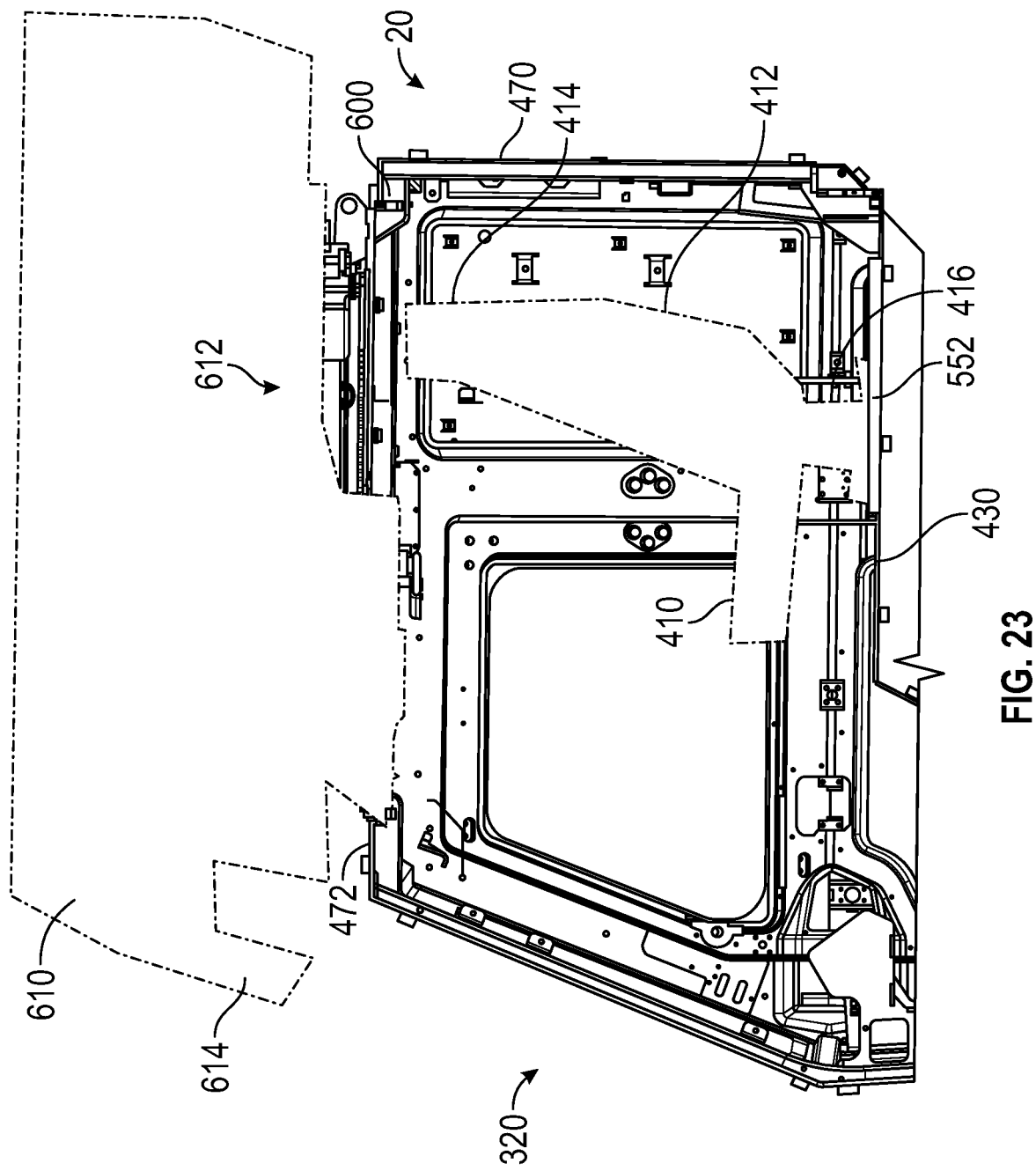
FIG. 23 is a side section view of the front cabin of FIG. 2 including a turret assembly, according to an exemplary embodiment.
Figure 24:
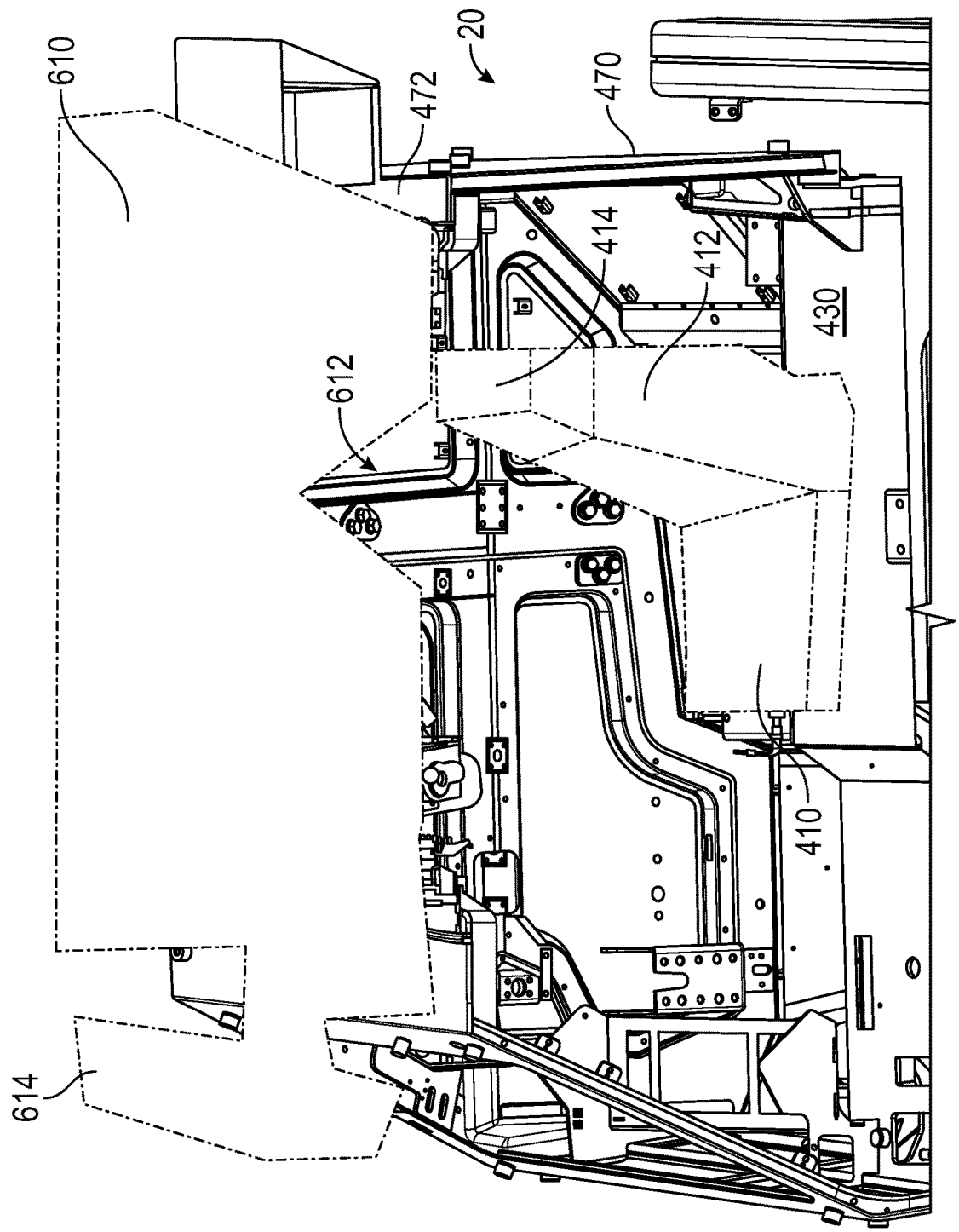
FIG. 24 is a perspective section view of the front cabin of FIG. 2 including the turret assembly of FIG. 23.

Referring to FIGS. 23 and 24, the center seat 400 is shown in the use position. In the use position, the center seat 400 is located directly below a gun turret, shown as turret assembly 610. The turret assembly 610 is coupled to the roof 472. An aperture 612 is defined through both the turret assembly 610 and the roof 472 to facilitate access to the turret assembly 610 from the interior of the front cabin 20. The gunner may extend their upper body (e.g., torso, etc.) through the aperture 612 into the turret assembly 610 to view the surroundings of the vehicle 10 and/or use a weapon. The turret assembly 610 may include one or more of a mounted weapon, a set of walls 614 at least partially surrounding the aperture 612 to protect the gunner when using the turret assembly 610, a drive system configured to rotate the turret assembly 610 relative to the front cabin 20, and a door or hatch to selectively close off the aperture 612 and seal the front cabin 20. In some embodiments, the gunner uses a portable gun instead of a mounted gun. In the use position, the center seat 400 is located directly below the aperture 612 such that the head of the gunner may extend partially or completely through the aperture 612 when seated. This improves the seated comfort of the gunner relative to a conventional seat arrangement because the head of the gunner does not contact the roof 472.

When using the turret assembly 610, the gunner stands in the front cabin 20 and extends their upper body through the aperture 612, where the gunner may operate the mounted gun. The center seat 400 may be moved to the stored position when operating the turret assembly 610. In such embodiments, the gunner stands on the center floor section 430 underneath the turret assembly 610. In other embodiments, the center seat 400 remains in the use position during operation of the turret assembly 610. In such embodiments, the gunner may stand on the seat bottom 410 of the center seat 400 and thereby extend their body farther through the aperture 612. The gunner may choose whether to move the center seat 400 to the use position or the stored position depending on their height. By way of example, a shorter gunner may choose to stand on the seat bottom 410 instead of the center floor section 430 as the higher position of the seat bottom 130 may place the gunner's upper body in a position that more readily facilitates use of a mounted weapon.

Door Assembly

Figure 25:
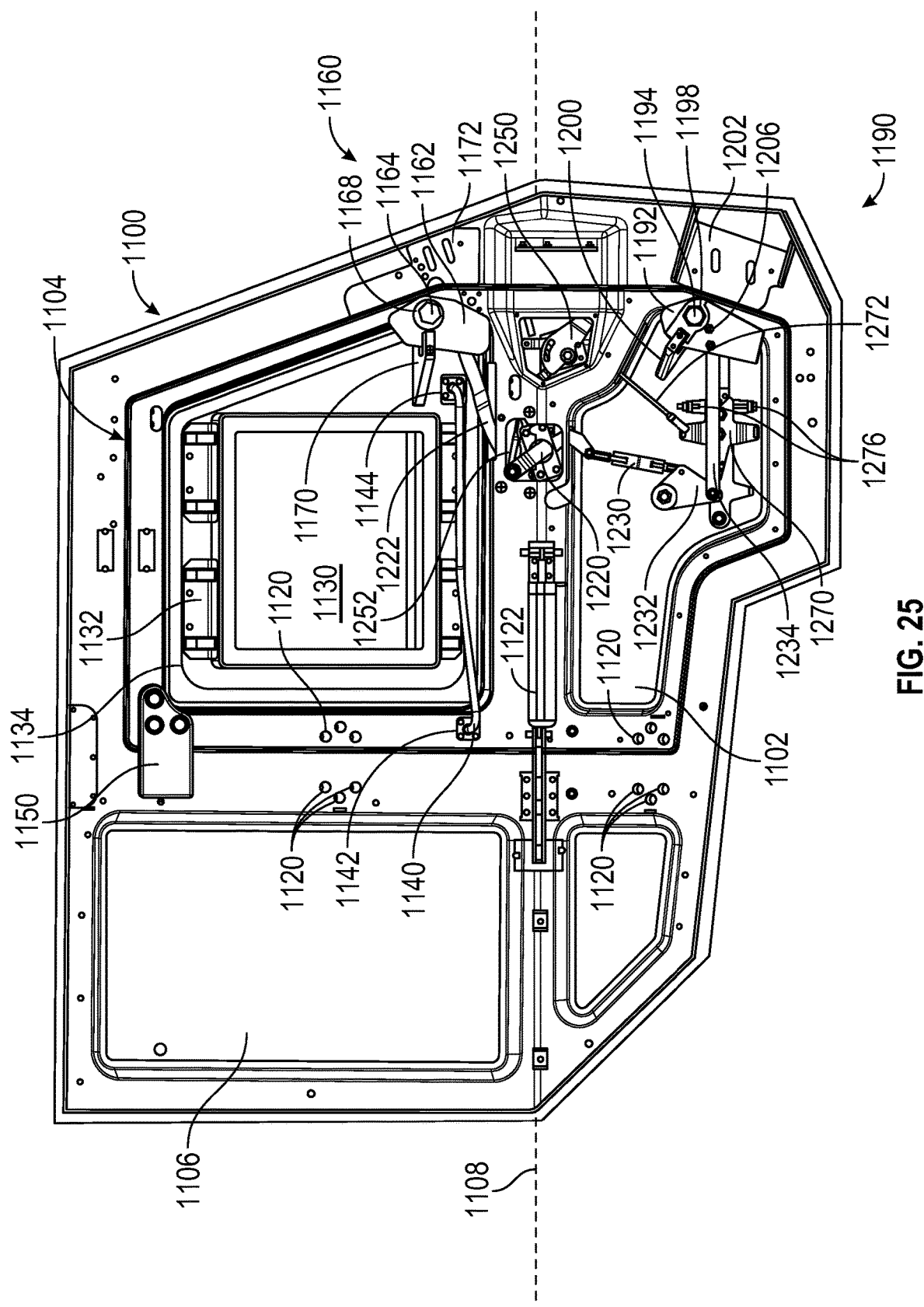
FIG. 25 is a side view of a door of the vehicle of FIG. 1 in an unlocked configuration, according to an exemplary embodiment.
Figure 26:
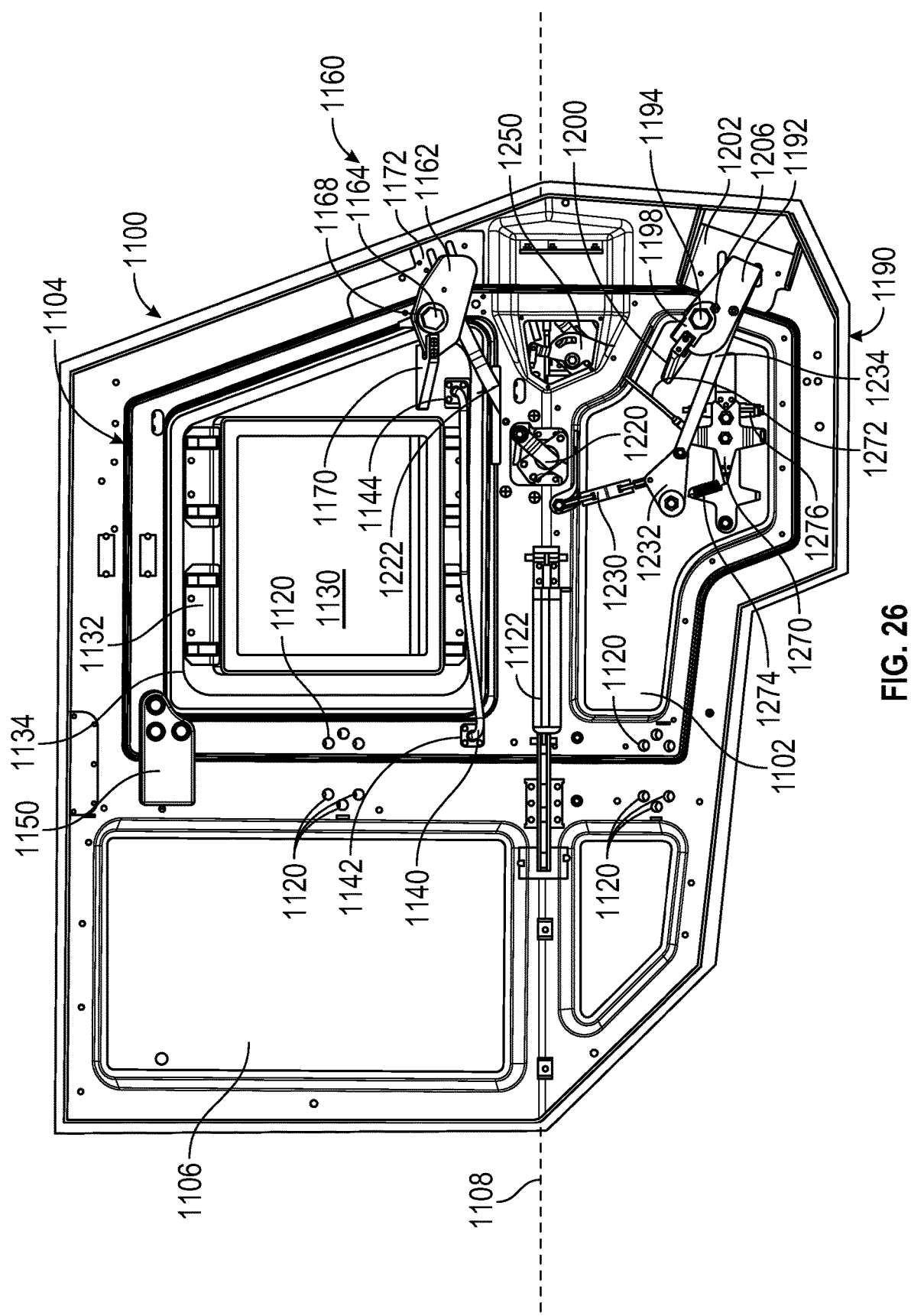
FIG. 26 is a side view of the door of FIG. 25 in a locked configuration.

Referring to FIGS. 25 and 26, a door 1100, including a frame 1102, is shown that may be substantially similar to the doors 22. Each of the doors shown herein may be mirrored and used on the opposite side of the front cabin 20. In some embodiments, the frame 1102 is constructed from multiple layers of sheet metal with one or more blocks coupled to the sheet metal to facilitate attachment of other components. In some embodiments, one or more portions of the frame 1102 are constructed from a single piece of material spanning the entire thickness of the frame 1102. FIG. 25 shows the door 1100 in an unlocked configuration, and FIG. 26 shows the door 1100 in a locked configuration. The door 1100 is disposed within an opening 1104 defined by a wall 1106 of the front cabin 20. The wall 1106 may make up the left or the right side of the front cabin 20. Both the door 1100 and the wall 1106 may be bent about an axis 1108 such that a width of the front cabin 20 decreases toward the top of the vehicle 10. The door 1100 is rotatably coupled to the wall 1106 through a pair of hinges that connect to a set of apertures, shown as hinge apertures 1120. In some embodiments, a body of each hinge defining an axis of rotation of the door 1100 relative to the wall 1106 is disposed outside of the front cabin 20 to facilitate the outward movement of the door 1100. An actuator, shown as gas spring 1122, is coupled to both the door 1100 and the wall 1106. The gas spring 1122 may provide a damping force and/or a biasing force to assist an operator in opening or closing the door 1100. By way of example, the gas spring 1122 may provide a biasing force to assist the operator in opening the door 1100. By way of another example, the gas spring 1122 may provide a dampening force to prevent the door 1100 from swinging open or closed too quickly.

Referring again to FIGS. 25 and 26, the door 1100 includes a transparent portion, shown as window 1130. The window 1130 facilitates the operator seeing out of the side of the front cabin 20. In some embodiments, the window 1130 is made from glass. In other embodiments, the window 1130 is made from a projectile and/or blast resistant material (e.g., polycarbonate, acrylic, etc.). The window 1130 is held in place relative to the door 1100 by a frame, shown as window frame 1132. The window frame 1132 may clamp the window 1130, provide a recess in which the window 1130 resides, fasten to the window 1130, or otherwise couple to the window 1130. The window frame 1132 is coupled to a window surround 1134. The window surround 1134 is couples the window frame 1132 to the frame 1102. The window surround 1134 may be a portion of the frame 1102 or may be a separate component coupled to the frame 1102. An interface member, shown as grip 1140, provides an operator with an interface through which to apply a pulling or pushing force to open or close the door 1100. As shown, the grip 1140 extends from the interior surface of the door 1100, forming a loop. As shown in FIGS. 25 and 26, the grip 1140 is coupled to the door 1100 at a first coupling point 1142 and a second coupling point 1144. The first coupling point 1142 is located on the frame 1102. In some embodiments, the second coupling point 1144 is located on the window surround 1134. In other embodiments, the second coupling point 1144 is located on the frame 1102. The location of the second coupling point 1144 may be driven by the location and/or presence of other components of the door 1100.

Referring again to FIGS. 25 and 26, the door 1100 includes a retainer, shown as paddle 1150. The paddle 1150 is removably coupled to the frame 1102. The paddle 1150 may be fastened to the frame 1102 through apertures 1152 (shown in FIG. 27). In some embodiments, the frame 1102 includes a reinforcing structure (e.g., a block) near the apertures 1152 to strengthen that particular portion of the door 1100. The paddle 1150 is located near the upper end of the door 1100 and extends from the frame 1102 over (e.g., across an inner surface of) the wall 1106. The paddle 1150 is positioned above both of the hinges. Given that the door 1100 swings out of the front cabin 20 when opened, the paddle 1150 does not interfere with normal operation of the door 1100. During a blast event, the force imparted on the door 1100 by an explosion may cause the door 1100 to deflect. Conventionally, the upper end of a door is not held in place relative to the surrounding wall, facilitating free deflection of the door. In some cases, the force of an explosion causes the upper end of a door to deflect outwards. The frame of the door may then act as a spring, causing the upper end of the door to spring back inside of the front cabin, potentially contacting the head of an operator and causing injury. The paddle 1150 prevents the upper end of the door 1100 from deflecting outwards, removing the potential for the frame 1102 to gain enough momentum to spring inward of the front cabin 20 and contact an operator. Accordingly, the addition of the paddle 1150 improves the safety of the vehicle 10 during a blast event.

Again referring to FIGS. 25 and 26, the door 1100 includes a lock assembly, shown as upper lock assembly 1160. The upper lock assembly 1160 includes a paddle 1162 that rotates about a shaft member, shown as bolt 1164. Bolt 1164 is coupled to frame 1102 through a boss 1166 (shown in FIG. 27), which is in turn coupled to or integrally formed with the frame 1102. In some embodiments, a spacer 1168 is disposed between the paddle 1162 and a head of the bolt 1164 to facilitate retaining the paddle 1162. The paddle 1162 is configured to rotate about the bolt 1164 from a locked position when the door 1100 is in the locked configuration, shown in FIG. 26, to an unlocked position when the door 1100 is in the unlocked configuration, shown in FIG. 25. A retainer, shown as fork 1170, extends inward from the window surround 1134 and surrounds a portion of the paddle 1162. A plate, shown as reinforcement plate 1172, covers a portion of the wall 1106 that is covered by the paddle 1162 in the locked position. In the unlocked configuration, the door 1100 can open and close freely. In the locked configuration, the paddle 1162 extends over (e.g., along an inner surface of) the wall 1106, and the wall 1106 imparts a force on the paddle 1162 to counteract any force directed to opening the door, preventing the door 1100 from opening. The reinforcement plate 1172 strengthens the portion of the wall 1106 that imparts force on the paddle 1162 and reduces wear on the wall 1106 from the sliding of the paddle 1162. In some embodiments, a cover extends from the frame 1102 underneath the window surround 1134 to the fork 1170, covering a portion of the upper lock assembly 1160. The cover is coupled to both the frame 1102 and the fork 1170. In some embodiments, other covers are coupled to and cover portions of the door 1100.

Again referring to FIGS. 25 and 26, the door 1100 includes a second lock assembly, shown as lower lock assembly 1190. The lower lock assembly 1190 includes a paddle 1192 that rotates about a shaft member, shown as bolt 1194. Bolt 1194 is coupled to frame 1102 by a boss, which is in turn coupled to or integrally formed with the frame 1102. In some embodiments, a plate 1198 is disposed between the paddle 1192 and a head of the bolt 1194 to facilitate retaining the paddle 1192. The paddle 1192 is configured to rotate about the bolt 1194 from a locked position when the door 1100 is in the locked configuration, shown in FIG. 26, to an unlocked position when the door 1100 is in the unlocked configuration, shown in FIG. 25. A retainer, shown as fork 1200, extends from the frame 1102 and surrounds a portion of the paddle 1192. A plate, shown as reinforcement plate 1202, covers a portion of the wall 1106 that is covered by the paddle 1192 in the locked position. In the unlocked configuration, the door 1100 can open and close freely. In the locked configuration, the paddle 1192 extends over (e.g., along an inner surface of) the wall 1106, and the wall 1106 imparts a force on the paddle 1192 to counteract any force directed to opening the door, preventing the door 1100 from opening. The reinforcement plate 1202 strengthens the portion of the wall 1106 that imparts force on the paddle 1192 and reduces wear on the wall 1106 from the sliding of the paddle 1192. The reinforcement plate 1202 may include one or more portions bent up from the surface of the wall 1106 to facilitate coupling of other components to the wall 1106. In some embodiments, a protrusion 1206 extends from the paddle 1192. In such embodiments, the fork 1200 prevents rotation of the plate 1198, and the plate 1198 is shaped such that it contacts the protrusion 1206 to prevent rotation of the paddle 1192 past a certain rotational position. Although the upper lock assembly 1160 and the lower lock assembly 1190 are shown in specific locations, it should be understood that the upper lock assembly 1160 and the lower lock assembly 1190 could be located anywhere along the perimeter of the frame 1102.

Referring again to FIGS. 25 and 26, the upper lock assembly 1160 and the lower lock assembly 1190 are actuated between the locked and unlocked positions by a series of linkages connected to a link or lever, shown as handle link 1220. The handle link 1220 is rotatably coupled to the frame 1102 near the center of the door 1100. An upper end of the handle link 1220 is coupled to the paddle 1162 through a link 1222. When the handle link 1220 rotates clockwise as shown in FIGS. 25 and 26, the paddle 1162 rotates to the locked position. The lower end of the handle link 1220 is coupled to the paddle 1192 through a first link, shown as turnbuckle 1230, a second link, shown as rotating link 1232, and a third link, shown as link 1234. In some embodiments, the length of the turnbuckle 1230 is adjustable, (e.g., by threading a bolt in or out of the turnbuckle 1230) to facilitate adjustment of the position of the paddle 1192. The rotating link 1232 is rotatably coupled to the frame 1102. In some embodiments, the rotating link 1232 is coupled to the frame 1102 using a similar bolt, spacer, and boss arrangement to the upper lock assembly 1160. When the handle link 1220 rotates clockwise as shown in FIGS. 25 and 26, the rotating link 1232 rotates counterclockwise and the paddle 1192 moves toward the locked position.

As shown in FIGS. 25 and 26, a link, shown as central link 1250 is rotatably coupled to the frame 1102. The central link 1250 is coupled to the handle link 1220 through a link, shown as connecting link 1252. The connecting link 1252 couples the rotation of the handle link 1220 and the central link 1250 such that clockwise rotation of one causes clockwise rotation of the other. The central link 1250 may interface with a portion of the frame 1102 to limit rotation of the central link 1250, and by extension the handle link 1220 in one or both directions (e.g., to stop at in the locked or unlocked configurations. In some embodiments, a handle is coupled to the one or both of the handle link 1220 and the central link 1250 to facilitate an operator reconfiguring the door 1100 from the locked configuration to the unlocked configuration and vice versa. The central link 1250 may be configured to actuate an additional latch that selectively holds the door 1100 shut in normal operation, but not during a blast event. The door 1100 further includes a spring link 1270. The spring link 1270 may be coupled to the central link 1250 through a connecting link 1272 such that as the central link 1250 rotates clockwise, the spring link 1270 rotates counterclockwise. The spring link 1270 may be biased in a clockwise direction by a biasing member, shown as spring 1274. A pair of stops 1276 limit rotation of the spring link 1270.

Figure 27:
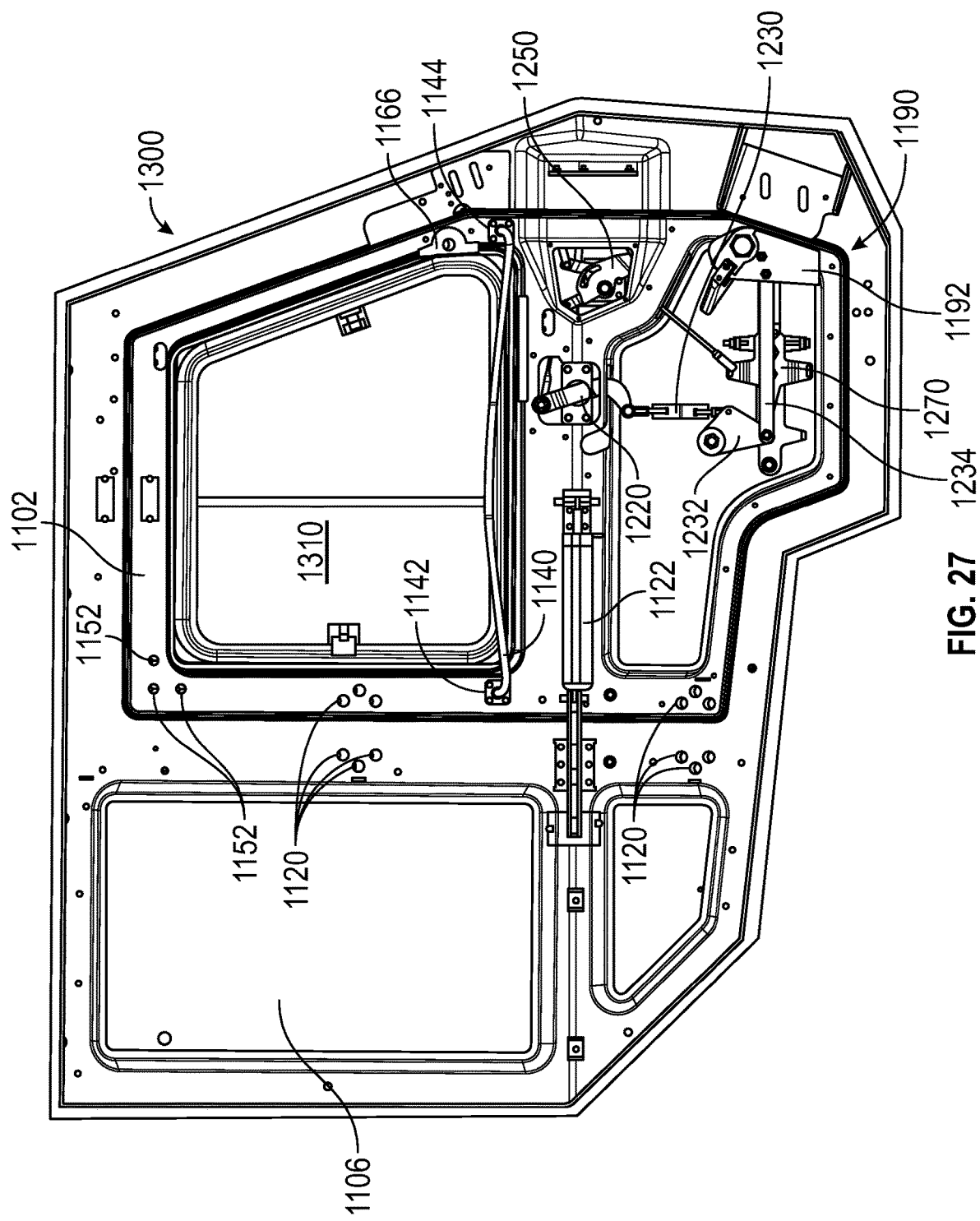
FIG. 27 is a side view of a door of the vehicle of FIG. 1, according to another exemplary embodiment.

Referring to FIG. 27, a door 1300 is shown as an alternative configuration of the door 1100. The door 1300 may be substantially similar to the door 1100 except as otherwise stated herein. The upper lock assembly 1160 is removed from the door 1300, however, the boss 1166 is still included coupled to the frame 1102. The paddle 1150 is removed, leaving the apertures 1152 exposed. The window 1130, the window frame 1132, and the window surround 1134 are replaced with a cover 1310. The cover 1310 may be removable without the use of tools (e.g., by coupling the cover 1310 to the frame 1102 with a latch). In other embodiments, one or more of the window 1130, the window frame 1132, and the window surround 1134 remain in the door 1300 and are covered by the cover 1310. The first coupling point 1142 of the grip 1140 remains in the same location as in the door 1100, and the second coupling point 1144 moves to frame 1102 near the frontmost edge of the door 1300. This change in location facilitates an increase in width of the grip 1140. The increased width of the grip 1140 provides the operator with an increased mechanical advantage when opening or closing the door 1300.

Figure 28:
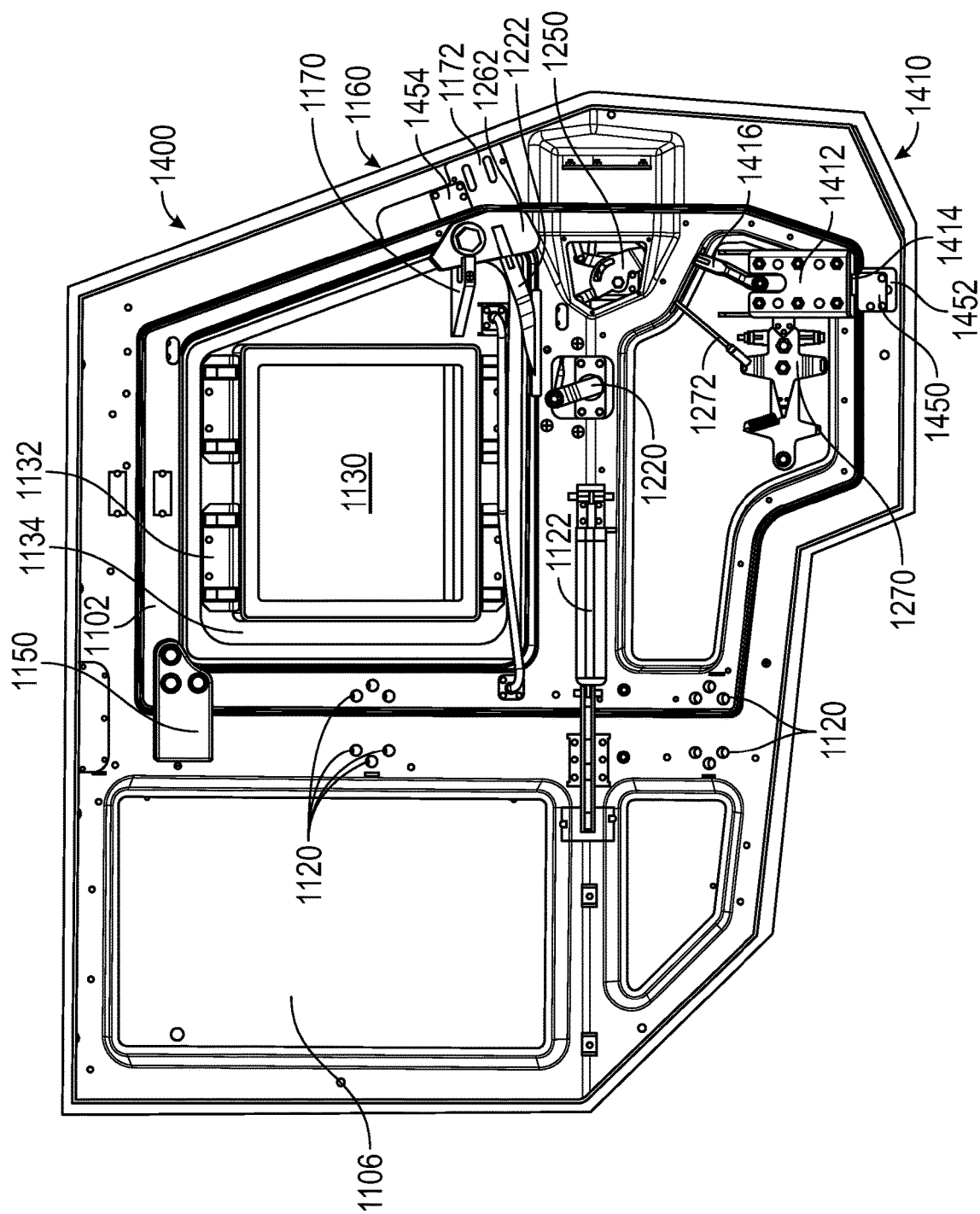
FIG. 28 is a side view of a door of the vehicle of FIG. 1, according to yet another exemplary embodiment.

Referring to FIG. 28, a door 1400 is shown according to an alternative embodiment. The door 1400 may be substantially similar to the door 1100 except as otherwise stated. In place of the lower lock assembly 1190, the door 1400 includes a lock assembly, shown as lower lock assembly 1410. The lower lock assembly 1410 includes a body 1412 coupled to the frame 1102, and a locking member 1414 translates in and out of the body 1412. In a locked position, the locking member 1414 extends out of the body 1412 and over the wall 1106, preventing opening of the door 1400. In an unlocked position, the locking member 1414 is received by the body 1412, and the door 1400 can open and close freely. The locking member 1414 is connected to the central link 1250 through a connecting link 1416. When the central link 1250 rotates clockwise, the locking member 1414 is extended toward the locked position. A reinforcement plate 1450 is coupled to the wall 1106 through a reinforcement plate 1452. A reinforcement plate 1454 is coupled to the reinforcement plate 1172. The reinforcement plates may be used to strengthen the wall 1106 and reduce wear on the wall 1106 from the sliding action of the paddle 1162 or the locking member 1414.

Figure 30:
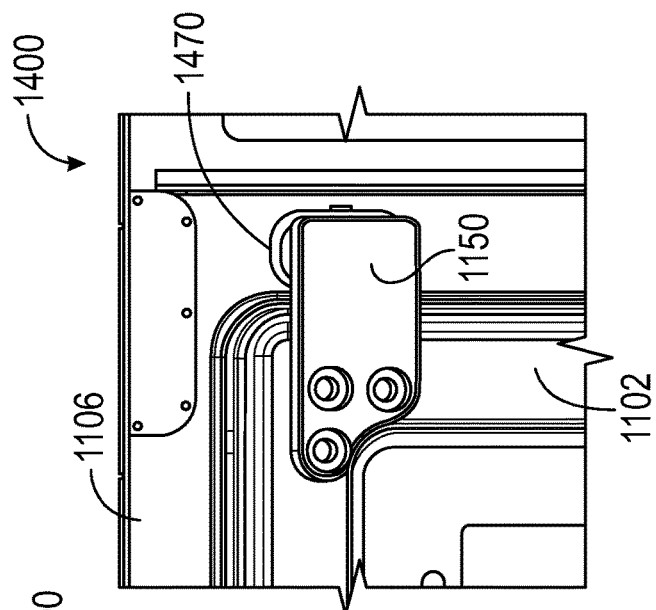
FIG. 30 is a perspective view of a retainer of the door of FIG. 29, according to an exemplary embodiment.
Figure 29:
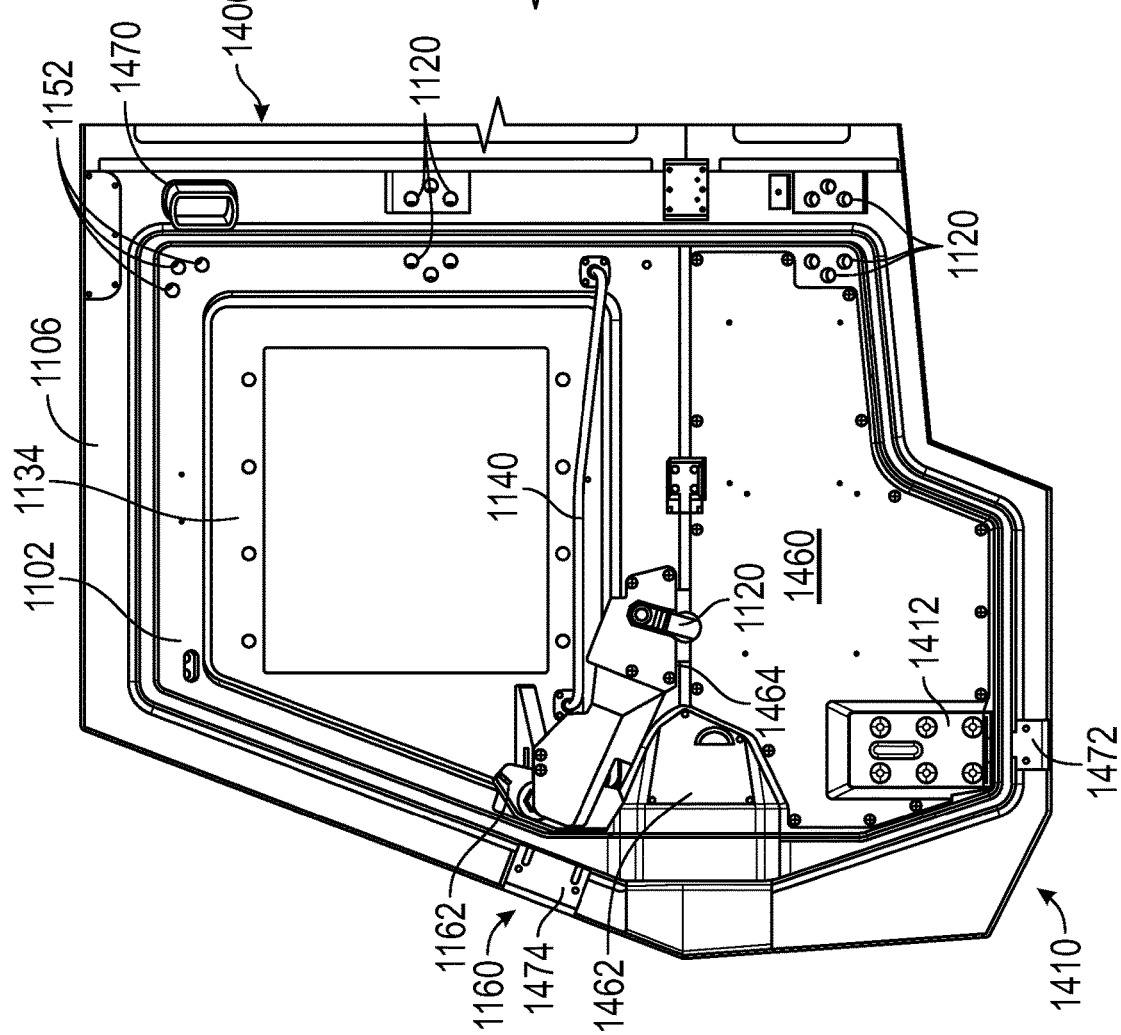
FIG. 29 is a side view of a door of the vehicle of FIG. 1, according to yet another exemplary embodiment.

Referring to FIG. 29, the door 1400 is shown in a configuration including a series of covers. A cover 1460 extends over the spring link 1270 and the connecting link 1416. A cover 1462 extends over the central link 1250. A cover 1464 extends over upper lock assembly 1160. The covers 1460, 1462, and 1464 obscure various components and prevent the occupants of the front cabin 20 from coming into contact with moving components of the door 1400. The door 2100 is mirrored relative to the door 1400 such that it can be used on the opposite side of the front cabin 20. The door 1400 further includes a block 1470, a block 1472, and a block 1474. The block 1470, the block 1472, and the block 1474 are received by the wall 1106 and may be welded to the wall 1106. Each of the blocks extend partway outside of the wall 1106 such that the blocks are visible within the front cabin 20. In other embodiments, the blocks are positioned fully within the wall 1106 such that they are not visible from within the front cabin 20. As shown in FIG. 30, the block 1470 is configured to strengthen the wall 1106 where the wall 1106 is contacted by the paddle 1150. The block 1472 is configured to strengthen the wall 1106 where the wall 1106 is contacted by the locking member 1414. The block 1474 is configured to strengthen the wall 1106 where the wall 1106 is contacted by the paddle 1162. The window surround 1134 is shown without the window frame 1132 or the window 1130.

Figure 31:
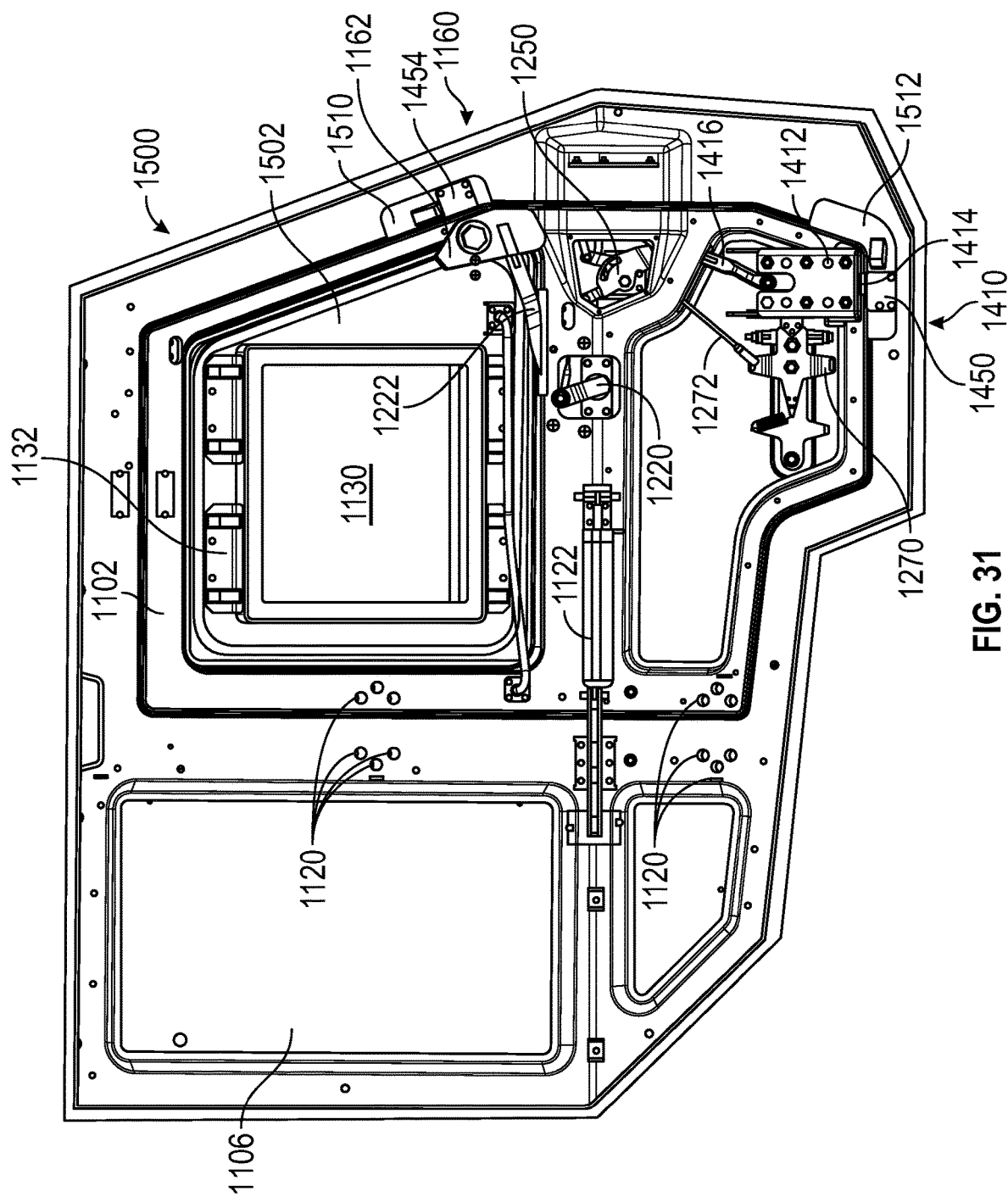
FIG. 31 is a side view of a door of the vehicle of FIG. 1, according to yet another exemplary embodiment.
Figure 32:
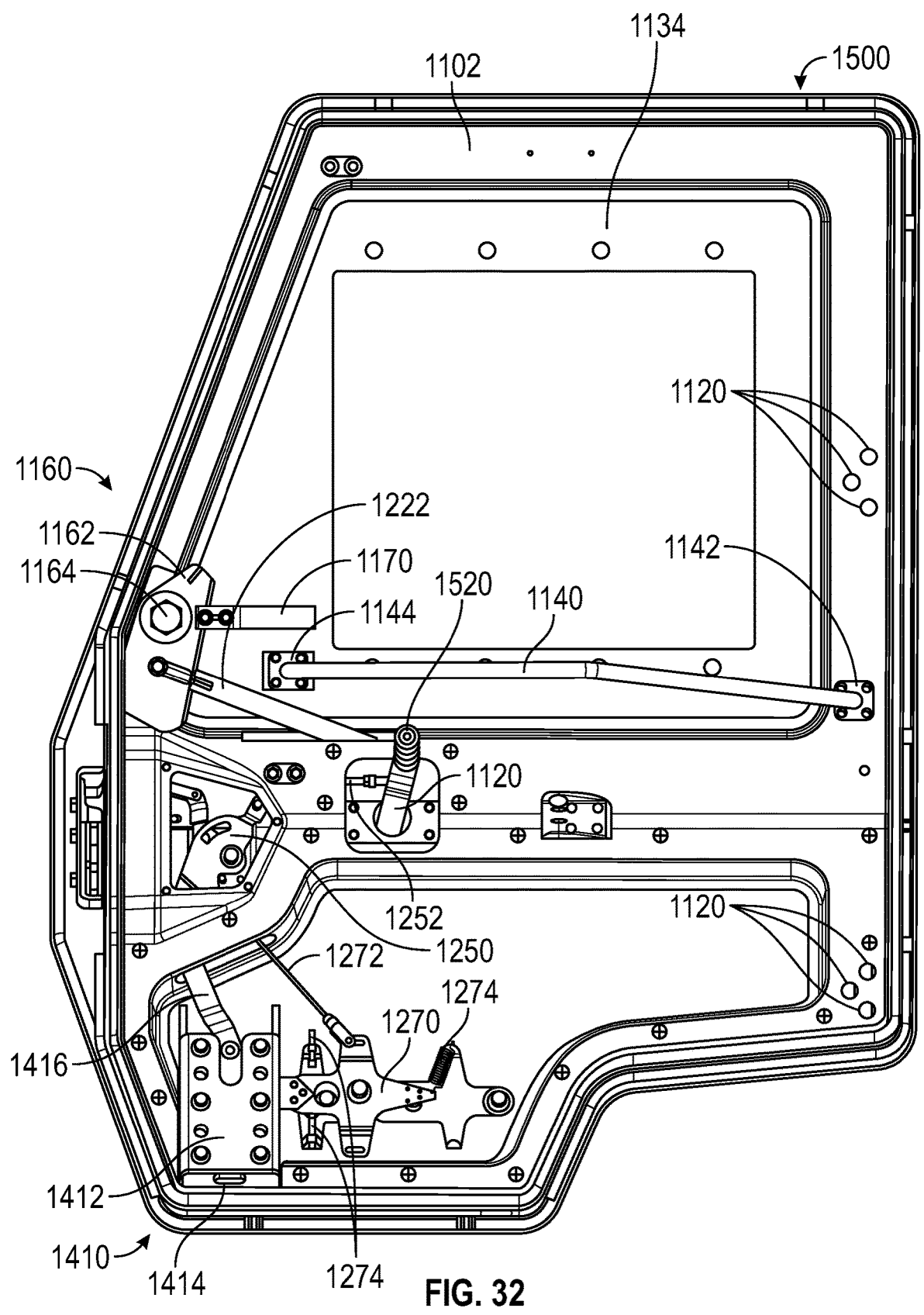
FIG. 32 is another side view of the door of FIG. 31.

Referring to FIGS. 31 and 32, a door 1500 is shown according to an alternative embodiment. The door 1500 may be substantially similar to the door 1400 except as otherwise stated. The door 1500 omits the paddle 1150, the apertures 1152, the fork 1170, the reinforcement plate 1172, and the reinforcement plate 1452. The door 1500 includes a window surround 1502 that is not configured to be coupled to the fork 1170. The door 1500 further includes a reinforcement plate 1510 in place of the reinforcement plate 1172 and a reinforcement plate 1512 in place of the reinforcement plate 1452. Referring to FIG. 32, the door 1500 includes a handle or grip 1520 coupled to the handle link 1220 to facilitate actuation of the lock assemblies by an occupant. The grip 1520 extends laterally inward from the door 1500.

Figure 33:
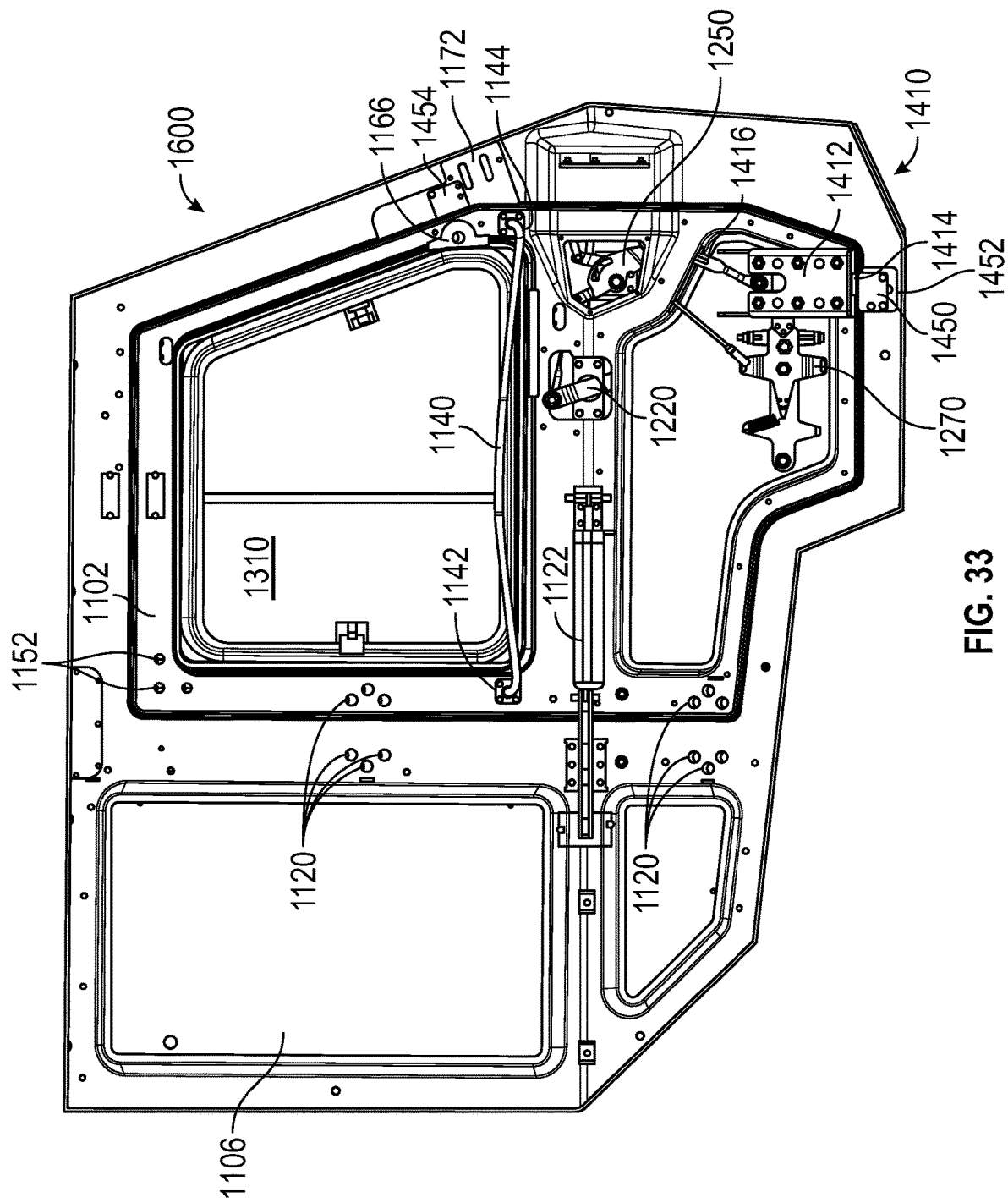
FIG. 33 is a side view of a door of the vehicle of FIG. 1, according to yet another exemplary embodiment.

Referring to FIG. 33, a door 1600 is shown according to an alternative embodiment. The door 1600 may be substantially similar to the door 1300 except as otherwise stated. The door 1600 omits the lower lock assembly 1190 and includes the lower lock assembly 1410. The door 1600 further includes the reinforcement plate 1450, the reinforcement plate 1452, and the reinforcement plate 1454.

Figure 34:
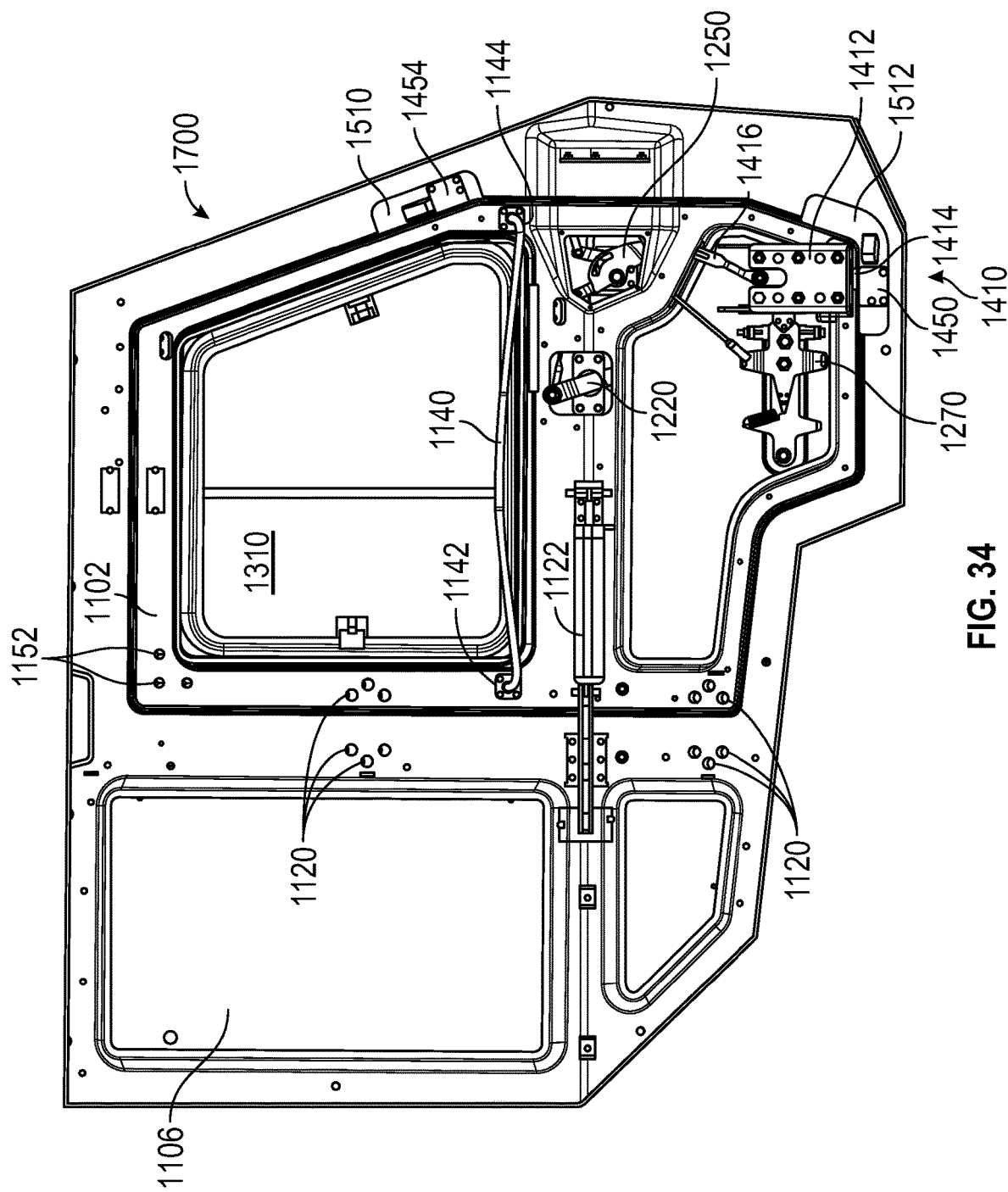
FIG. 34 is a side view of a door of the vehicle of FIG. 1, according to yet another exemplary embodiment.

Referring to FIG. 34, a door 1700 is shown according to an alternative embodiment. The door 1700 may be substantially similar to the door 1600 except as otherwise stated. The door 1700 omits the apertures 1152, the boss 1166, the reinforcement plate 1172, and the reinforcement plate 1452. The door 1700 includes the reinforcement plate 1510 and the reinforcement plate 1512.

Figure 35:
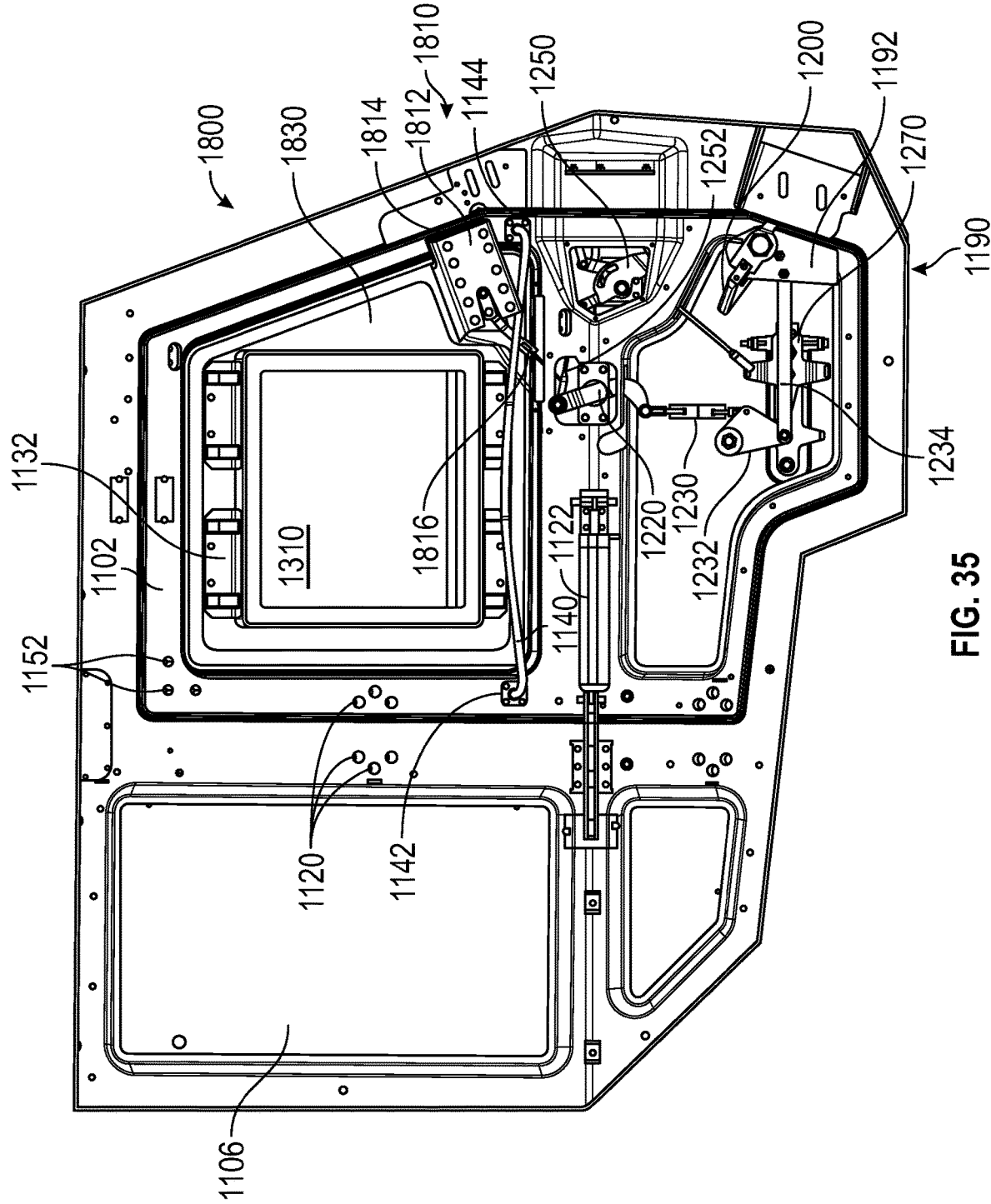
FIG. 35 is a side view of a door of the vehicle of FIG. 1, according to yet another exemplary embodiment.
Figure 36:
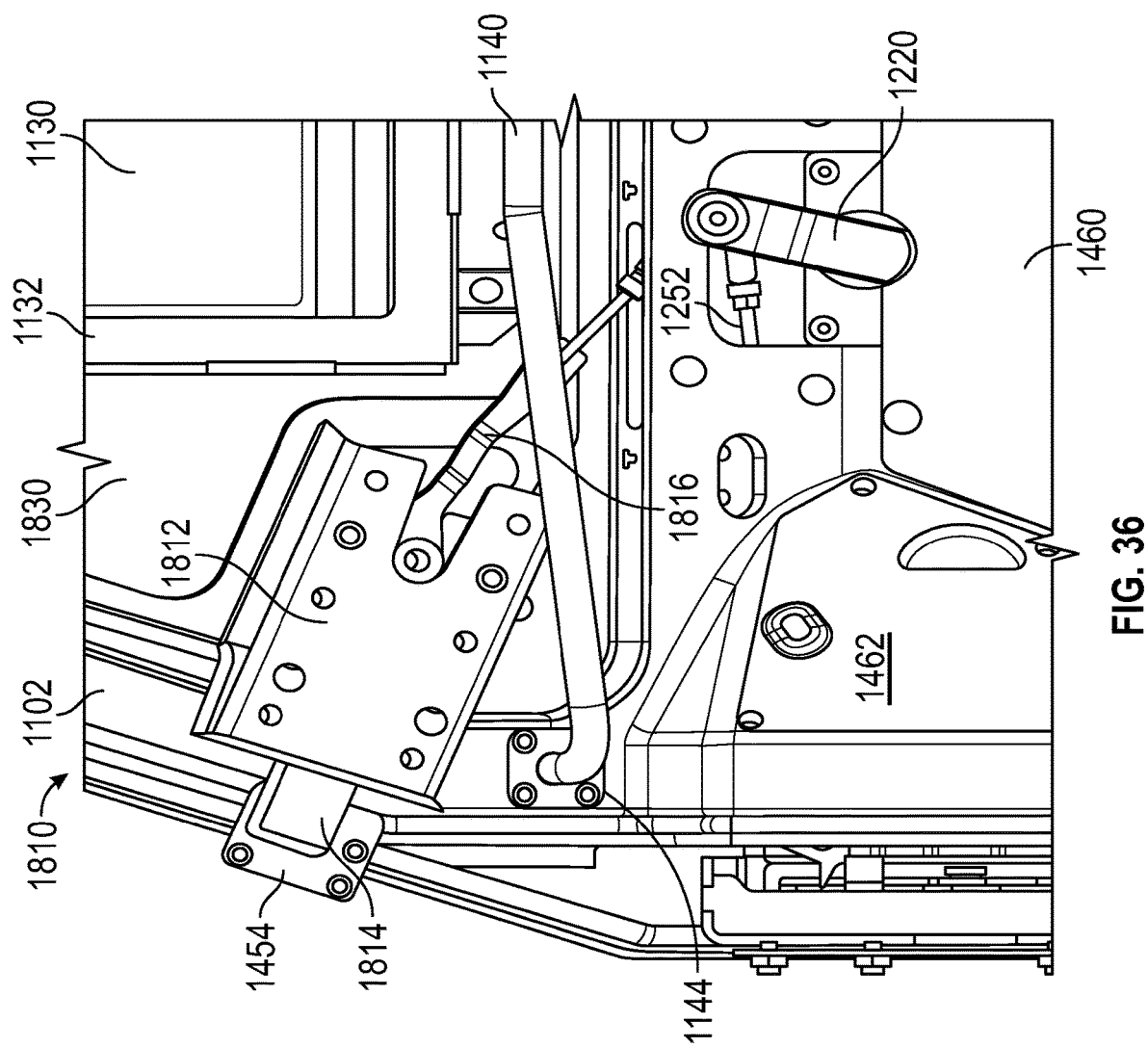
FIG. 36 is a side view of a lock assembly of the door of FIG. 35, according to an exemplary embodiment.
Figure 37:
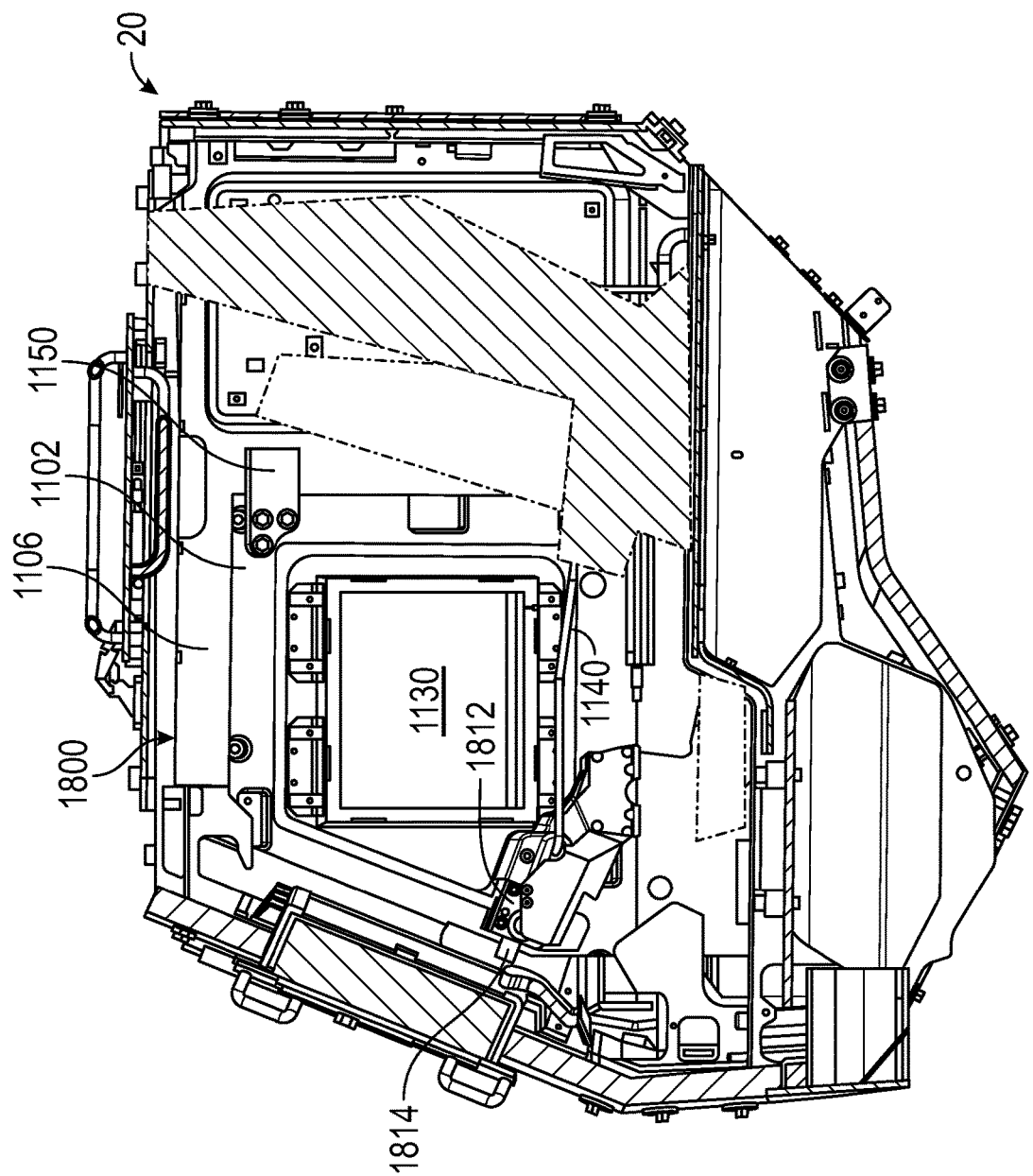
FIG. 37 is a section view of the front cabin of FIG. 2 including the door of FIG. 35.

Referring to FIGS. 35 and 36, a door 1800 is shown according to an alternative embodiment. The door 1800 may be substantially similar to the door 1100 except as otherwise stated. The door 1800 omits the paddle 1150. The arrangement of the grip 1140 in the door 1800 is substantially similar to the arrangement of the grip 1140 in the door 1300. In place of the upper lock assembly 1160, the door 1800 includes a lock assembly, shown as upper lock assembly 1810. The upper lock assembly 1810 includes a body 1812 and a locking member 1814 that translates in and out of the body 1812. In a locked position, the locking member 1814 extends out of the body 1812 and over the wall 1106, preventing opening of the door 1800. In an unlocked position, the locking member 1814 is received by the body 1812, and the door 1800 can open and close freely. The locking member 1814 is connected to the connecting link 1252 through a connecting link 1816. When the handle link 1220 rotates clockwise, the locking member 1814 is extended toward the locked position. The door 1800 includes a window surround 1830 configured to be coupled to the body 1812. As shown in FIG. 37, the door 1800 includes a pair of covers 1820 coupled to the frame 1102 that cover a portion of the upper lock assembly 1810.

Figure 38:
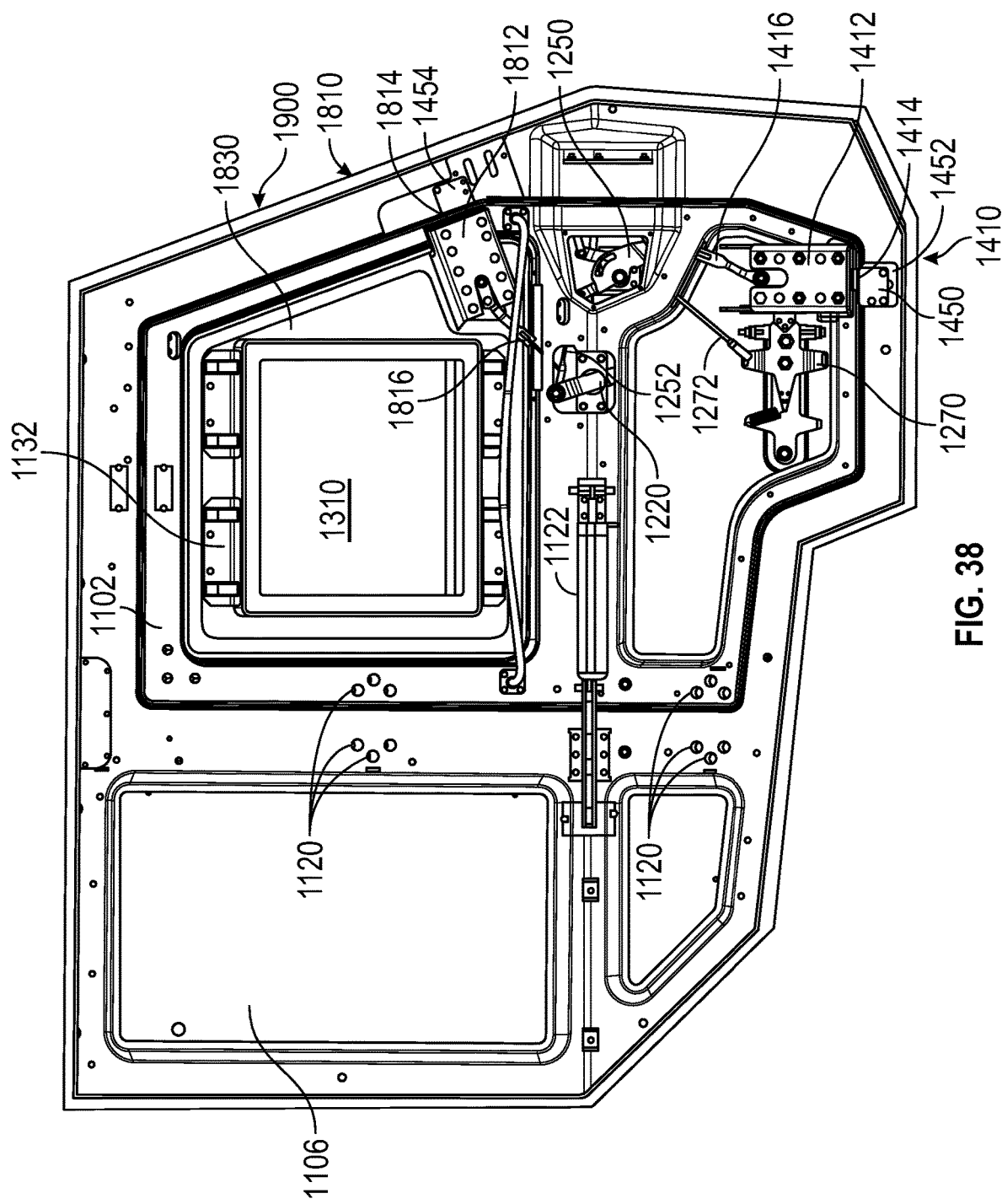
FIG. 38 is a side view of a lock assembly of the door of FIG. 35, according to an exemplary embodiment.
Figure 39:
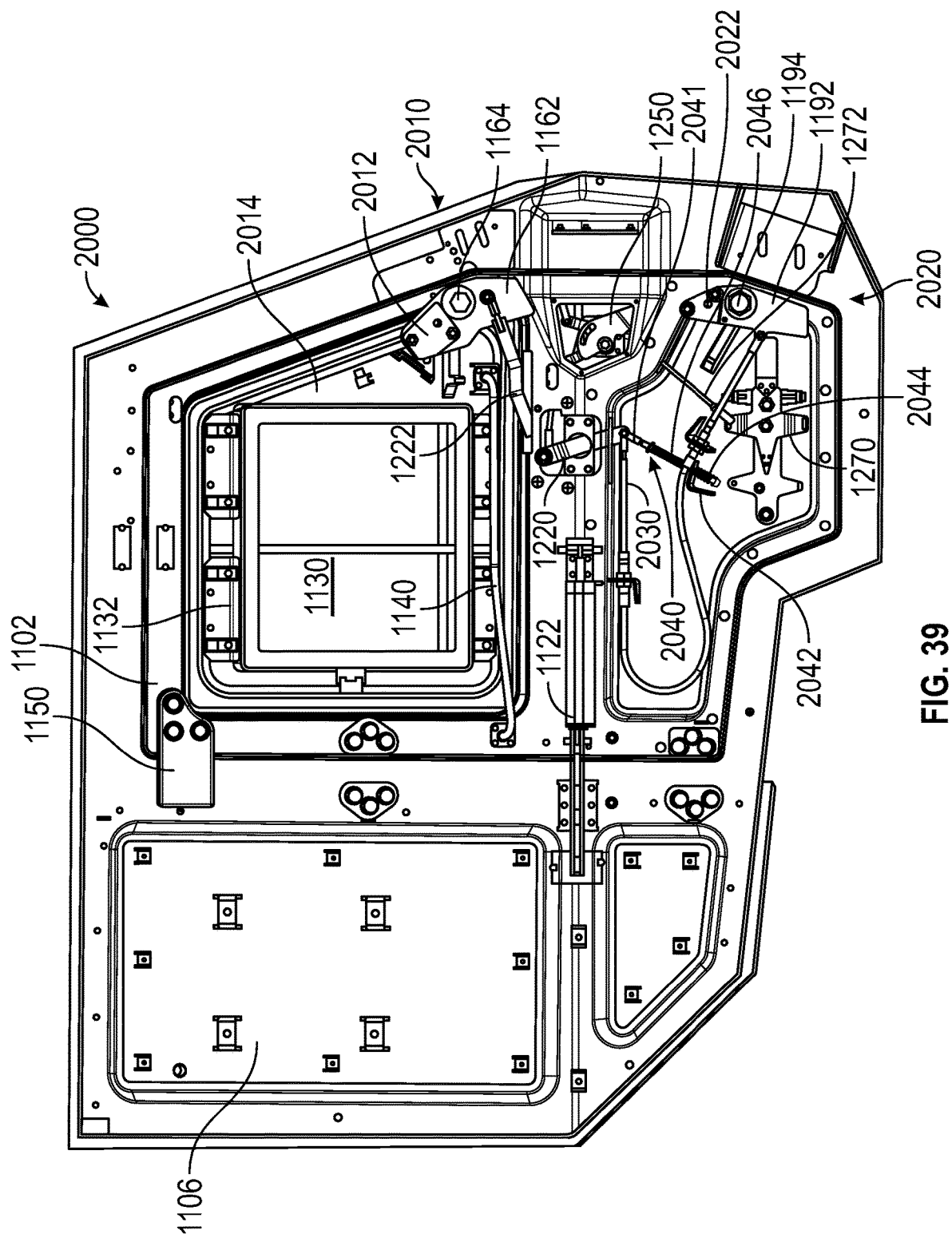
FIG. 39 is a side view of a lock assembly of the door of FIG. 35, according to an exemplary embodiment.

Referring to FIG. 38, a door 1900 is shown according to an alternative embodiment. The door 1900 may be substantially similar to the door 1800 except as otherwise stated. The door 1900 includes the lower lock assembly 1410 instead of the lower lock assembly 1190. The door 1900 further includes reinforcement plate 1450, reinforcement plate 1452, and reinforcement plate 1454.

Referring to FIG. 38, a door 2000 is shown according to an alternative embodiment. The door 2000 may be substantially similar to the door 1100 except as otherwise stated. The door 2000 includes an upper lock assembly 2010 and a lower lock assembly 2020. The upper lock assembly 2010 and the lower lock assembly 2020 are substantially similar to the upper lock assembly 1160 and the lower lock assembly 1190, respectively, except the upper lock assembly 2010 includes a weight, shown as counterweight 2012, and the lower lock assembly 2020 includes a counterweight 2022. The counterweight 2012 is coupled to the paddle 1162. The counterweight 2012 is offset from the axis of rotation of the paddle 1162 extending through the bolt 1164. The force of gravity acting on the counterweight 2012 provides a biasing force to bias the paddle 1162 toward the locked position. Accordingly, during a blast event, the mass of the counterweight 2012 causes the paddle 1162 to rotate toward the locked position automatically, preventing the door 2000 from opening. Similarly, the counterweight 2022 is coupled to the paddle 1192 and offset from the axis of rotation of the paddle 1192. Accordingly, the counterweight 2022 provides a similar effect. Additionally, the door 2000 includes a window surround 2014 that couples to the frame 1102, the window frame 1132, and the grip 1140.

The door 2000 omits the turnbuckle 1230, the rotating link 1232, and the link 1234. Instead, the door 2000 includes a tensile member, shown as cable 2030. The cable 2030 couples the handle link 1220 to the paddle 1192. When the handle link 1220 is rotated counterclockwise, the handle link 1220 imparts a tensile force on the cable 2030. The cable 2030 transfers this force to the paddle 1192, overcoming the biasing force of the counterweight 2022 and moving the paddle 1192 to the unlocked position. When the handle link 1220 is rotated clockwise, tension on the cable 2030 is released, and the counterweight 2022 moves the paddle 1192 back to the locked position.

The door 2000 further includes a biasing assembly, shown as biasing device 2040. The biasing device 2040 includes a shaft 2041 pivotably coupled to the handle link 1220. The shaft 2041 is received through an aperture defined by a protrusion 2042 extending outward from the frame 1102. A first biasing member 2044 extends between the shaft 2041 and the protrusion 2042 such that the first biasing member 2044 compresses when the shaft 2041 moves upward. A second biasing member 2046 extends between the shaft 2041 and the protrusion 2042 such that the second biasing member 2046 compresses when the shaft 2041 is moved downward. When the handle link 1220 is rotated between the locked position and the unlocked position, the shaft 2041 first moves downward, then back upward. This movement compresses the second biasing member 2046 such that the second biasing member 2046 provides a biasing force onto the shaft 2041. The biasing force opposes the initial portion of the movement of the handle link 1220 and facilitates the second portion of the movement of the handle link 1220. Accordingly, when the handle link 1220 is near the locked position, the biasing device 2040 opposes motion toward the unlocked position. Similarly, when the handle link 1220 is near the unlocked position, the biasing device 2040 opposes motion toward the locked position the biasing device 2040. The direction of the biasing force changes at a position between the unlocked position and the locked position. The biasing device 2040 prevents the door 2000 from unintentionally being locked or unlocked, especially during a blast event.

A number of the doors described herein provide the operator with the ability to reconfigure each door between a number of different configurations. Each of the door configurations may offer a different degree of protection (e.g., blast resistance, protection from an intruder outside the vehicle 10 opening the door, bullet resistance, etc.). The doors may be reconfigured between an A-kit configuration (e.g., an unarmored configuration, a light armor configuration, etc.) and a C kit configuration (e.g., an armored configuration, a heavily armored configuration, etc.). In the A-kit configuration, the door is lightly armored for use in a situation where minimal protection is required (e.g., civilian use, military use in a non-combat area, etc.). The A-kit configuration requires fewer and/or less robust components to achieve this level of protection than the C-kit, and as such can be lighter and lower cost. In the C-kit configuration, the door is configured for use in a combat zone. In the C-kit configuration, additional armor and/or locking components may be added to the door to increase the degree of protection afforded to the operator. By way of example, the C-kit configuration may provide a greater resistance to explosives, projectiles, or unauthorized opening of the door by an outside intruder. In some embodiments, the door is additionally configurable into a B-kit configuration. The B-kit configuration also affords a greater degree of protection than the A-kit configuration, but utilizes different components than the C-kit configuration. The ability to change between different configurations facilitates the vehicle 10 being optimally configured for the situation in which it will operate.

Each door may be reconfigurable between the different configurations without modifying the frame 1102. Each door may be reconfigured by simply adding components to or removing components from the frame 1102. This facilitates the vehicle 10 being reconfigured (e.g., between the A-kit and C-kit configurations) without having to store an entirely different door or frame 1102 for each configuration. When this concept is applied over an entire fleet of vehicles, a relatively small number of components (e.g., the components necessary to outfit a portion of the vehicles in the fleet into the C-kit configuration) can be stored and distributed to only the vehicles that will be operating in situations that require the added components.

By way of example, the door 1300 may represent an A-kit configuration, the door 1800 may represent a B-kit configuration, and the door 1100 may represent a C-kit configuration. The door is selectively reconfigurable between the A-kit configuration, the B-kit configuration, and the C-kit configuration. In the C-kit configuration, the door 1100 is configured for use in a combat scenario. The exterior of the door 1100 may be outfitted with armor panels or another type of armor. The door 1100 includes the upper lock assembly 1160 and the lower lock assembly 1190 that function as combat locks, increasing the blast resistance of the door 1100 while preventing the door from being opened by an outside intruder. The door 1100 further includes the paddle 1150, which provides added protection to the operator, as described above.

In the A-kit configuration, the door 1300 is configured for use in a non-combat scenario. When reconfiguring the door 1100 (i.e., the C-kit configuration) into the door 1300 (i.e., the A-kit configuration), the grip 1140, the paddle 1150, the upper lock assembly 1160, and the link 1222 are removed by unbolting them from the frame 1102. The boss 1166 remains coupled to the frame 1102 to facilitate later coupling of the upper lock assembly 1160 to the frame 1102. A grip 1140 of increased width may be bolted to the frame 1102, and the window 1130, the window frame 1132, and the window surround 1134 may be replaced with the cover 1310. In other embodiments, the window 1130 is replaced with a window that is thinner and/or made from a less blast resistant or bulletproof material. The reverse of this process can be completed to reconfigure the door 1300 (i.e., the A-kit configuration) into the door 1100 (i.e., the C-kit configuration).

In the B-kit configuration, the door 1800 is configured for use in a combat scenario. When reconfiguring the door 1300 (i.e., the A-kit configuration) into the door 1800 (i.e., the B-kit configuration), the cover 1310 is removed and replaced with the window 1130, the window frame 1132, and the window surround 1830 which is, in turn, coupled to the upper lock assembly 1810. The connecting link 1816 is coupled to the connecting link 1252 to facilitate actuation of the locking member 1814. The reverse of this process can be completed to reconfigure the door 1800 (i.e., the B-kit configuration) into the door 1300 (i.e., the A-kit configuration).

In another embodiment, the door 2000 is a C-kit configuration. To convert the door 2000 to an A-kit configuration, the grip 1140, the paddle 1150, the upper lock assembly 2010, and the link 1222 are removed by unbolting them from the frame 1102. The boss 1166 remains coupled to the frame 1102 to facilitate later coupling of the upper lock assembly 2010 to the frame 1102. A grip 1140 of increased width may be bolted to the frame 1102, and the window 1130, the window frame 1132, and the window surround 2014 may be replaced with the cover 1310. In other embodiments, the window 1130 is replaced with a window that is thinner and/or made from a less blast resistant or bulletproof material.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the terms "exemplary" and "example" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent, etc.) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," "between," etc.) are merely used to describe the orientation of various elements in the figures. It should be noted that the orientation of various elements may differ according to other exemplary embodiments, and that such variations are intended to be encompassed by the present disclosure.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

It is important to note that the construction and arrangement of the systems as shown in the exemplary embodiments is illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

What is claimed is:

1. A vehicle, comprising:
 a frame including a frame rail that extends longitudinally;
 a plurality of tractive assemblies engaging the frame;
 a cabin configured to contain at least one operator during operation of the vehicle; and
 a mount configured to pivotably couple the cabin to the frame, the mount comprising:
  a boss coupled to the cabin and defining a first aperture;
  a first bracket defining a second aperture;
  a pin extending through the first aperture and the second aperture to pivotably couple the boss to the first bracket;
  a second bracket coupled to the frame rail; and
  a first isolator and a second isolator extending between the first bracket and the second bracket and configured to couple the first bracket to the second bracket, wherein the first isolator and the second isolator are configured to reduce the transfer of vibrations between the frame and the cabin;
 wherein the cabin is configured to rotate between a use position and a maintenance position, wherein the cabin is positioned near the frame in the use position, and wherein the cabin is rotated away from the frame in the maintenance position.

2. The vehicle of claim 1, wherein the first bracket includes a plate and a pair of protrusions extending upward therefrom, wherein the protrusions extend on opposite sides of the boss, wherein the protrusions define the second aperture and a third aperture, respectively, and wherein the pin extends through the first, second, and third apertures to pivotably couple the boss to the first bracket.

3. The vehicle of claim 2, wherein the second bracket includes a top plate and a side plate, wherein the top plate is fixedly coupled to the side plate, wherein the side plate extends along a side surface of the frame rail, and wherein the top plate extends along a top surface of the frame rail.

4. The vehicle of claim 3, wherein the mount further comprises a fastener extending through each isolator and the plate of the first bracket and coupling the isolator corresponding to the fastener to the top plate of the second bracket, wherein each isolator extends both (a) between the plate of the first bracket and the top plate of the second bracket and (b) above the plate of the first bracket.

5. The vehicle of claim 1, further comprising a linear actuator pivotably coupled to both the frame rail and the cabin, wherein the linear actuator is configured to rotate the cabin between the use position and the maintenance position.

6. The vehicle of claim 5, further comprising a third bracket coupled to the frame rail, wherein the linear actuator is a cylinder including a rod, a cylinder body, and a pair of protrusions extending laterally outward from the cylinder body, wherein one of the protrusions is received by the third bracket to pivotably couple the cylinder body to the frame rail, and wherein the rod is configured to extend out of the cylinder body to rotate the cabin toward the maintenance position.

7. The vehicle of claim 5, further comprising a rear support coupled to the frame rail rearward of the linear actuator, wherein the rear support includes a latch configured selectively couple the cabin to the frame rail when the cabin is in the use position, thereby selectively preventing rotation of the cabin.

8. The vehicle of claim 7, wherein the rear support is a first rear support, the latch is a first latch, and the frame rail is a first frame rail, further comprising a bridge support coupled to the cabin and a second rear support including a second latch, wherein the frame further includes a second frame rail laterally offset from the first frame rail, wherein the second rear support is coupled to the second frame rail, and wherein the first latch and the second latch are configured to engage the bridge support to selectively couple the cabin to the frame rail when the cabin is in the use position, thereby selectively preventing rotation of the cabin.

* * * * *